US009515795B2

(12) United States Patent
Bao et al.

(10) Patent No.: US 9,515,795 B2
(45) Date of Patent: Dec. 6, 2016

(54) WIRELESS COMMUNICATION SYSTEM, NETWORK DEVICE, AND TERMINAL DEVICE

(75) Inventors: Dongshan Bao, Beijing (CN); Jing Wang, Beijing (CN); Shenfa Liu, Beijing (CN); Jun Lei, Beijing (CN); Lijun Pan, Beijing (CN); Zhigang Yan, Beijing (CN); Feifei Wang, Beijing (CN)

(73) Assignee: Nufront Mobile Communications Technology Co., Ltd., Beijing (CN)

( * ) Notice: Subject to any disclaimer, the term of this patent is extended or adjusted under 35 U.S.C. 154(b) by 223 days.

(21) Appl. No.: 14/007,194

(22) PCT Filed: Mar. 22, 2012

(86) PCT No.: PCT/CN2012/072774
§ 371 (c)(1),
(2), (4) Date: Dec. 9, 2013

(87) PCT Pub. No.: WO2012/130072
PCT Pub. Date: Oct. 4, 2012

(65) Prior Publication Data
US 2014/0086168 A1   Mar. 27, 2014

(30) Foreign Application Priority Data

| Mar. 25, 2011 | (CN) | 2011 1 0074598 |
|---|---|---|
| Mar. 31, 2011 | (CN) | 2011 1 0081193 |
| May 19, 2011 | (CN) | 2011 1 0130194 |
| Jan. 16, 2012 | (CN) | 2012 1 0011924 |
| Feb. 16, 2012 | (CN) | 2012 1 0035552 |
| Feb. 21, 2012 | (CN) | 2012 1 0041650 |
| Feb. 21, 2012 | (CN) | 2012 1 0041651 |
| Feb. 21, 2012 | (CN) | 2012 1 0041655 |

(51) Int. Cl.
*H04W 4/00* (2009.01)
*H04L 5/00* (2006.01)
(Continued)

(52) U.S. Cl.
CPC .......... *H04L 5/0053* (2013.01); *H04L 5/0091* (2013.01); *H04L 5/0096* (2013.01);
(Continued)

(58) Field of Classification Search
CPC . H04L 5/0053; H04L 5/0091; H04L 5/0096; H04L 5/1469; H04W 72/1226; H04W 99/00; H04W 28/06; H04W 48/08
See application file for complete search history.

(56) References Cited

U.S. PATENT DOCUMENTS

| 2004/0170157 A1 | 9/2004 | Kim et al. |
| 2008/0042728 A1 | 2/2008 | Kwean |
| 2009/0185632 A1* | 7/2009 | Cai ............... H04L 5/0044 375/260 |

FOREIGN PATENT DOCUMENTS

| CN | 101207541 A | 6/2008 |
| CN | 101297581 A | 10/2008 |

OTHER PUBLICATIONS

International Search Report issued in International Application No. PCT/2012/072774 on Jun. 28, 2012.

*Primary Examiner* — Yemane Mesfin
*Assistant Examiner* — Abdelillah Elmejjarmi
(74) *Attorney, Agent, or Firm* — Morgan, Lewis & Bockius LLP

(57) ABSTRACT

Disclosed in present invention is a wireless communication system, comprising: a CAP, for determining a structure of a current physical frame according to scheduled transmission resources, and sending information for indicating the structure of the current physical frame in the current physical frame; and at least one STA communicating with the CAP, for determining the structure of the current physical frame according to the information for indicating the structure of the current physical frame, the length of each physical frame depending on the structure of the current physical frame and being not fixed. Also disclosed are two devices for wireless communication.

19 Claims, 13 Drawing Sheets

(51) Int. Cl.
*H04W 99/00* (2009.01)
*H04L 5/14* (2006.01)
*H04W 72/12* (2009.01)
*H04W 48/08* (2009.01)
*H04W 28/06* (2009.01)

(52) U.S. Cl.
CPC ........ *H04L5/1469* (2013.01); *H04W 72/1226* (2013.01); *H04W 99/00* (2013.01); *H04W 28/06* (2013.01); *H04W 48/08* (2013.01)

WIRELESS COMMUNICATION SYSTEM, NETWORK DEVICE, AND TERMINAL DEVICE

CROSS-REFERENCE TO RELATED APPLICATION

This application claims the benefit of Chinese patent application No. 201110074598.5 filed on Mar. 25, 2011 and titled "METHOD AND SYSTEM FOR ADJUSTING DEMODULATION PILOT FREQUENCY IN WIRELESS COMMUNICATION SYSTEM", which is incorporated herein by reference in its entirety.

This application claims the benefit of Chinese patent application No. 201110081193.4 filed on Mar. 31, 2011 and titled "A wireless communication Method, System and device", which is incorporated herein by reference in its entirety.

This application claims the benefit of Chinese patent application No. 201110130194.3 filed on May 19, 2011 and titled "A wireless communication System", which is incorporated herein by reference in its entirety.

This application claims the benefit of Chinese patent application No. 201210011924.2 filed on Jan. 16, 2012 and titled "A wireless communication Method and device", which is incorporated herein by reference in its entirety.

This application claims the benefit of Chinese patent application No. 201210035552.7 filed on Feb. 16, 2012 and titled "A wireless communication Method and device", which is incorporated herein by reference in its entirety.

This application claims the benefit of Chinese patent application No. 201210041655.4 filed on Feb. 21, 2012 and titled "A wireless communication System and device for wireless communication", which is incorporated herein by reference in its entirety.

This application claims the benefit of Chinese patent application No. 201210041650.1 filed on Feb. 21, 2012 and titled "A device for wireless communication", which is incorporated herein by reference in its entirety.

This application claims the benefit of Chinese patent application No. 201210041651.6 filed on Feb. 21, 2012 and titled "A device for wireless communication", which is incorporated herein by reference in its entirety.

FIELD OF THE INVENTION

The present invention belongs to the technical field of wireless communications, and in particular, relates to wireless communication systems, network device and terminal device.

BACKGROUND OF THE INVENTION

Over the recent years, wireless network technology include the wireless LAN technique WiFi that is based on the 802.11 standard, the Bluetooth system that is based on the 802.15 standard, the Femto technique that is directed to indoor applications and derived from the mobile communication system, etc.

The WiFi technology based on IEEE 802.11 is the most extensively used wireless network transmission technology at present. A WiFi system is defective for its relatively low system efficiency and significant waste of wireless resources due to the employment of a Carrier Sense Multiple Access with Collision Avoidance (CSMA/CA) mechanism. An essential reason for such a defect lies in that the CSMA/CA mechanism is a random multi-access mechanism based on competition, and there exist competitions for the access right to wireless resources between a Central Access Point (CAP) and a Station (STA) or between different STAs due to the CSMA/CA mechanism. Simultaneous competitions for a wireless channel will result in a collision, thus leading to the wireless resource waste. To avoid such collision, the CSMA/CA mechanism requires the CAPs or STAs to retreat randomly from the competition for the wireless channel. If all of the CAPs and STAs retreat, the wireless channel is not utilized even it is idle, causing significant waste of the wireless channel. Therefore, the system efficiency of IEEE 802.11 is relatively low. For example, although the peak rate at the physical layer in an IEEE 802.11g system may reach 54 Mbps, the reachable peak rate of a large-packet download service at the Transmission Control Protocol (TCP) layer is no more than 30 Mbps. Despite of the above defects, the IEEE 802.11 system is flexible and does not rely on a centralized control mechanism, so that the device costs are relatively low.

A Femto technology based on 3GPP standards, which is derived from a mobile communication system, is a new technology intended for indoor coverage. Since about 70% of data services is conducted in doors according to data statistics of the 3G system, an indoor high-speed data access solution is especially important. A Femto base station, which is named as a Pico Base Transceiver Station, is small in volume (like in WiFi technologies) and flexible in deployment. The Femto base station inherits almost all features of a mobile communication system due to its derivation from the mobile communication system. Considering its limited coverage range and a relatively small number of access users, the Femto device is designed with a decreased processing capability, to reduce the device costs. In terms of a duplexing manner, Femto base stations may operate in two duplexing mechanisms, i.e. a Frequency Division Duplexing (FDD) and a Time Division Duplexing (TDD), just like the mobile communication system. Because FDD uplink and downlink carrier resources are symmetric, certain resource waste is caused for a data service in a FDD system due to a service feature that uplink and downlink data flow of the data service are asymmetric. In a TDD system, however, both uplink and downlink operate at the same carrier, and different wireless resources are allocated for the uplink and downlink through the division of time resources, thus the TDD system can be more suitable for a data service characterized by asymmetric uplink and downlink service demands, in comparison with an FDD system. In the mobile communication system (including a Femto system), however, due to the static allocation of uplink and downlink resources in the TDD duplexing manner, it is difficult to implement dynamic matching between service demands and resource division in the case of various data services with different demands, such as web surfing, mobile videos and mobile games. Due to the employment of a centralized control mechanism based on scheduling, and hence there is no wireless resource waste that is caused by competition collision between the Base Station or CAP and a User Equipment or between User Equipments and random retreat, the Femto technology is advantageous for a higher link efficiency in comparison with the WiFi technology.

Although Femto system also by scheduling assigned radio resource to different terminals uplink and downlink communication, but its frame structure of static configuration cannot match radio resource flexibly allocated for uplink and downlink, it is not able to adapt to traffic variation in a smaller particle size, when configuration between traffic and resource is imbalance or cause long queuing, degrade user experience, or cause waste of channel capacity.

SUMMARY OF THE INVENTION

Accordingly, the present invention is to solve the technical problem of providing wireless communication systems, network devices and terminal devices.

By using the proposed scheme, may perform the following functions:

CAP centralized scheduling with its associated STA, so as to allocate radio resources for different STA, avoids waste of radio resources caused by contention mechanism.

Some performance such as dynamic TDD frame length and frame structure configuration, flexible uplink and downlink resources of proportioning can be achieved, system efficiency for indoor scene improved, and control overhead and scheduling overhead saved. Separating dynamically downlink radio resources based on the transmission resource requirements, enables better dynamic adaptation of future data traffic with wide variety and various data characteristics uplink and downlink transmission requirement and no fixed frame length constraints, frame structure is flexible, while also reducing implementation complexity.

Enabling system to allocate radio resource for user and uplink/downlink communication with a smaller particle size resource, the allocation of resource can better adapt to services change, the radio resource allocated for user and uplink/downlink communication can better fit traffic requirement and channel transmission conditions.

Not only can adapt to higher service rate demand change in different terminals, but also better adapt dynamic change of the wireless channel.

The present invention can better fit dynamic change of various data traffic demand, matching the dynamic traffic demand with channel capacity, better system efficiency can be obtained. Different wireless communication scenario, adaptively adjust frame structure, optimization system overhead. It is possible to trade-off traffic demand to channel characteristics, dynamic partitioning uplink/downlink resources, considering link adaptation conditions, allocate radio resources to different terminals dynamically.

In addition to the above features, the present invention also contemplates channel state information feedback delay, processing time required by different grade equipment etc. The above considerations are able to improve system efficiency and performance.

Feedback of this frame can be achieved, reducing feedback delay of MU-MIMO (multi-user multiple-input-multiple-output).

Realize scheduling of this frame, reducing service scheduling delay.

BRIEF DESCRIPTION OF THE DRAWING

FIG. 20 is schematic of resource scheduling process in third application examples of the present invention;

FIG. 21 is a flow chart of uplink scheduling and transmission process in 4th application examples of the present invention;

ABBREVIATION OF SPECIAL NAME

Figure 1:
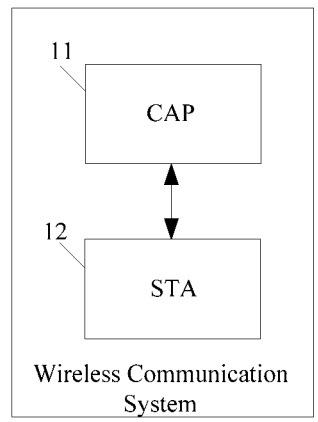
FIG. 1 is a structure diagram of wireless communication system in an embodiment of present invention.

LS: Leader Sequence
SICH: System Information Channel
CCH: Control Channel
DTCH: Downlink Transmission Channel
UTCH: Uplink Transmission Channel
UPCH: Uplink Probing Channel
DPCH: Downlink Probing Channel
URACH: Uplink Random Access Channel
DRACH: Downlink Random Access Channel
USRCH: Uplink Scheduling Request Channel
DSRCH: Downlink Scheduling Request Channel

DETAILED DESCRIPTION OF THE INVENTION

With the present invention, enable to avoid contention conflicts or waste of radio resources caused by random back-off. Being different from conventional mobile communication system (next generation mobile communication system including: LTE, WiMax), configuring dynamically structure of physical frame, present invention enable frame structure to be flexible, Separating dynamically uplink/downlink radio resources based on the transmission resource requirements, enables better dynamic adaptation of future data traffic with wide variety and various data characteristics uplink and downlink transmission requirement.

Smaller particle size resource can be provided in the system, Not only can adapt to higher service rate demand change in different terminals, but also better adapt dynamic change of the wireless channel.

As used herein, frame length of the physical frame is not fixed, the frame length determined by the physical frame structure, not only reducing control overhead and scheduling overhead for indoor applications, but also meeting the requirements of rapid changes in the outdoor, simultaneously lowering implementation complexity.

In summary, it is achievable to make trade-off traffic demand and channel characteristics, dynamic partitioning uplink/downlink resources, considering link adaptation conditions, to allocate dynamically radio resources to different terminals in present invention.

In present invention, the physical frame structure includes presence or absence of parts and time length, so the dynamic configuration of the physical frame structure, not only can configuration which parts included in the physical frame, may also be configured each fraction having a duration. As used herein, frame length of a physical frame depends on the physical frame structure, the frame length is not fixed.

In an embodiment of the present invention, physical frame based on TDD duplex mode (On a certain fixed carrier, accomplishing receiving and transmitting between CAP and STA by Tx-Rx time division), Each physical frame (Frame) comprises downlink-(DL, Downlink, from CAP to STA) sub-frame, a guard interval and uplink (UL, Uplink, from STA to CAP) sub-frame, frame structure and time length of the downlink sub-frame and the uplink frame structure can be dynamically configured, therefore each physical frame structure and frame length may also be dynamically variable.

The downlink sub-frame may include several parts as follow:

The leader sequence (Preamble), includes: short training sequence and long training sequence. Wherein, the short training sequence used for frame detection, automatic gain control, coarse frequency synchronization or coarse symbol synchronization, the long training sequence used for fine frequency synchronization, fine symbol synchronization or channel estimation etc;

The system information channel, used for sending system basic configuration information. Wherein the basic configuration information comprises frequency band configuration, antenna configuration, frame number and the like;

The control channel, used for transmitting the transmission resource allocation and scheduling, and transmission format of channel occupying the transmission resource, specific, depending on the particular application scenarios, control channel may indicate transmission resource allocation and scheduling, and these channel transport format for one or more of downlink transport channels, downlink probing channel, uplink transmission channels, uplink to the probing channel, uplink scheduling request channel and uplink random access channel;

The downlink transmission channel, used for transmitting downlink traffic, and/or downlink signaling, and/or uplink traffic feedback; Thus, downlink transport channel can be divided into downlink traffic transmission, downlink signaling and uplink traffic feedback channels by function;

The downlink probing channel, used for transmitting downlink probing signal.

Uplink sub-frame may include several parts:

Uplink probing channel, used for transmitting uplink probe;

Uplink scheduling request channel, used for triggering uplink transmission resource scheduling;

The uplink transmission channel, used for transmitting uplink traffic, and/or the uplink signaling, and/or downlink traffic feedback, and/or downlink channel quality information (CQI), and/or downlink channel state information (CSI) feedback, Thus, uplink transmission channel can be divided into uplink traffic transmission channel, uplink signaling channel, downlink traffic feedback channel, a CQI feedback channel, and a CSI feedback channel by function. Alternatively, selectable, the aforesaid CQI feedback channel and CSI feedback channel may be independent of the uplink transport channel.

The uplink random access channel, used for triggering new user access.

Tx-Rx switching time reserved for CAP and STA is required in embodiments of this present invention. For example: When operating mode between CAP and STA converting from downlink to uplink, status of radio frequency channel converted from receiving/transmitting to transmitting/receiving state; When operating mode between CAP and STA converting from uplink to downlink, status of the radio frequency channel converted from transmitting/receiving to receiving/transmitting state; In order to accomplish the above reserved Tx-Rx switching time, guard interval used for indicating downlink and uplink conversion time may be included in the physical frame structure. Specifically including two types, one is used for indicating downlink guard interval (DGI) converted form downlink to uplink, another is for indicating uplink guard interval (UGI) converted form uplink to downlink. The uplink guard interval may also be reserved in advance through transmit, that is, Enable Uplink transmitting operation ahead of time, reserving guard interval for switching form uplink to downlink for CAP and STA.

According to function of each channel in the physical frame structure, uplink scheduling request channel, uplink random access channel, downlink probing channels, uplink probing channel refer to as auxiliary channel.

FIG. 1 is a system structure diagram in an embodiment of the present invention, the system comprising:

A CAP11, determining current physical frame structure based on scheduled transmission resources, and transmitting information for indicating current physical frame structure in the current physical frame; and, At least one STA12 communicating with said CAP11, according to information for indicating information of current physical frame structure in physical frame, determining structure of current physical frame;

Wherein, length of each physical frame determined by its own structure, the length is unfixed.

Figure 2:
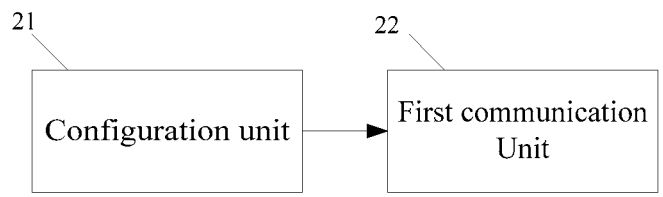
FIG. 2 is a structure diagram of network device in an embodiment of present invention.

FIG. 2 is a structure diagram of network device in a present invention embodiment; This network device includes: configuration unit 21 and first communication unit 22.

Configuration unit 21, for determining current physical frame structure according to the scheduling of transmission resource.

First communication unit 22, for transmitting information for indicating current physical frame structure in current physical frame, and communicating with at least one terminal device.

Length of each physical frame determined by its own construction, is unfixed.

In an alternative embodiment, configuration unit 21 configuring leader sequence used for synchronization for current physical, and system information channel used for sending information of indicating current physical frame structure.

Accordingly, the first communication unit 22 transmitting a leader sequence, and system information channel used for transmitting information of indicating current physical frame structure.

In another alternative embodiment, configuration unit 21 configuring leader sequence used for synchronization for current physical frame and system information channel used for sending information of indication current physical frame structure, further selectively configuring at least one of a plurality of channels for current physical frame.

Above-mentioned plurality of channel comprising following case:

1) The above-mentioned plurality of channel comprising: a first downlink transmission channel, used for transmitting downlink traffic, and/or downlink signaling, and/or uplink traffic feedback; The downlink probing channel, used for transmitting downlink probe; and, a second downlink transport channels, used for transmitting downlink traffic, and/or downlink signaling, and/or uplink traffic feedback.

In this basis, correspondingly, first communication unit 22 sending a leader sequence, transmitting system information for indicating current physical frame structure in system information channel; and, transmitting correlatively in selectively configured channel.

On this basis, configuration unit 21 determines current physical frame structure further comprising: configuring control channel for current physical frame, said control channel used for transmitting information of indicating allocation and scheduling of transmission resource, and transmission format of channel of occupying transmission resource. Accordingly, first communication unit 22 sends a leader sequence, transmitting information of indicating current physical frame structure in system information channel; transmitting information of indicating allocation and scheduling of transmission resource, and transmission format of channel of occupying transmission resource in control channel; And, transmitting correlatively in selectively configured channel. Alternatively, the first communication unit 22 sends a leader sequence; transmitting a part of information of indicating current physical frame structure in system information channel, wherein including at least duration of the control channel, transmitting another part of information of indicating current physical frame structure in control channel, transmitting information of indicating allocation and scheduling of transmission resource, and transmission format of channel of occupying transmission resource in control channel; and, transmitting correlatively in selectively configured channel.

2) The plurality of channels includes: uplink probing channel, for transmitting uplink probe; the uplink scheduling request channel, for transmitting uplink scheduling request; The uplink transmission channel, for uplink traffic transmission, and/or the uplink signaling, and/or downlink traffic feedback, and/or downlink of CQI feedback, and/or downlink of CSI feedback; and, uplink random access channel, for transmitting uplink random access request.

Alternatively, the plurality of channels comprising: uplink probing channels, for transmitting uplink probing signal; uplink scheduling request channel, for transmitting uplink scheduling request; uplink transmission channel, for transmitting uplink traffic, and/or uplink signaling, and/or downlink traffic feedback; CQI feedback channel, for transmitting CQI feedback for downlink; CSI feedback channels, for transmitting downlink CSI feedback; and, uplink random access channel, for transmitting uplink random access request.

On this basis, correspondingly, first communication unit 22 sends a leader, in the system information channel information indicates the current physical frame structure; and, receiving correlatively on selectively configured channel.

On this basis, configuration unit 21 determines current physical frame structure further comprising: configuring control channel for current physical frame, said control channel used for transmitting information of indicating allocation and scheduling of transmission resource, and transmission format of channel of occupying transmission resource. Accordingly, first communication unit 22 sends a leader sequence, transmitting information of indicating current physical frame structure in system information channel; transmitting information of indicating allocation and scheduling of transmission resource, and transmission format of channel of occupying transmission resource in control channel; And, receiving correlatively in selectively configured channel. Alternatively, first communication unit 22 sends a leader sequence; transmitting a part of information of indicating current physical frame structure in system information channel, wherein including at least duration of the control channel, transmitting another part of information of indicating current physical frame structure in control channel, transmitting information of indicating allocation and scheduling of transmission resource, and transmission format of channel of occupying transmission resource in control channel; And, receiving correlatively in selectively configured channel.

Figure 3:
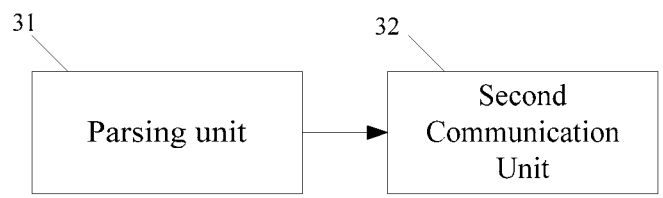
FIG. 3 is a structure diagram of terminal device in an embodiment of present invention.

FIG. 3 is a structure diagram of terminal device in a present invention embodiment, the terminal device comprises: parsing unit 31 and second communication unit 32.

The parsing unit 31, parsing information indicating current physical frame structure in current physical frame, determining current physical frame structure.

Second communication unit 32, communicating with network device within current physical frame.

Wherein, length of each physical frame determined by its own construction, is unfixed.

An alternative embodiment, current physical frame is composed of leader sequence, and, system information channel carrying information of indicating current physical frame structure.

On this basis, correspondingly, second communication unit 32 receiving leader sequence, and, receiving information of indicating current physical frame structure in system information channel.

Another alternative embodiment, current physical frame comprising a preamble sequence, system information channel of carrying information indicating current physical frame structure, and, at least one selectively configured channel.

The selectively configured channel can include:

1) The selectively configured channel comprising: uplink probing channel, for transmitting uplink probing signal; uplink scheduling request channel, for transmitting uplink scheduling request; uplink transmitting channel, for transmitting uplink traffic, and/or uplink signaling, and/or downlink traffic feedback, and/or CQI feedback of downlink, and/or CSI feedback of downlink; and, uplink random access channel, for transmitting uplink random access request.

Alternatively, said plurality of channels comprising: uplink probing channels, for transmitting uplink probing signal; uplink scheduling request channel, for transmitting uplink scheduling request; uplink transmission channel, for transmitting uplink traffic, and/or uplink signaling, and/or downlink traffic feedback; CQI feedback channel, for transmitting CQI feedback of downlink; CSI feedback channel, for transmitting CSI feedback of downlink; and, uplink random access channel, for transmitting uplink random access request.

On this basis, the second communication unit 32 receives leader sequence; in system channel receiving information of indicating current physical frame structure; and, transmitting correlatively in at least one selectively configured channel.

On this basis, current physical frame further comprising: control channel, used for transmitting information of indicating allocation and scheduling of transmission resource, and transmission format of channel of occupying transmission resource. Accordingly, second communication unit 32 receives a leader sequence, receiving information of indicating current physical frame structure in system information channel; receiving information of indicating allocation and scheduling of transmission resource, and transmission format of channel of occupying transmission resource in control channel; And, receiving correlatively in selectively configured channel. Alternatively, second communication unit 32 sends a leader sequence; receiving a part of information of indicating current physical frame structure in system information channel, wherein including at least duration of the control channel, receiving another part of information of indicating current physical frame structure in control channel, transmitting information of indicating allocation and scheduling of transmission resource, and transmission format of channel of occupying transmission resource in control channel; and, transmitting correlatively in selectively configured channel.

2) The selectively configurable channel comprises: first downlink transmission channel, for transmitting downlink traffic, and/or downlink signaling, and/or uplink traffic feedback; The downlink probing channel, for transmitting downlink probe; and, second downlink transport channels, for transmitting downlink traffic, and/or downlink signaling, and/or uplink traffic feedback.

On this basis, the second communication unit 32 receives leader sequence; in the channel reception information indicating the current physical frame structure; and, in at least one being selectively configured channel received is correlated.

On this basis, current physical frame further comprising: control channel, used for transmitting information of indicating allocation and scheduling of transmission resource, and transmission format of channel of occupying transmission resource. Accordingly, second communication unit 32 receives a leader sequence, receiving information of indicating current physical frame structure in system information channel; receiving information of indicating allocation and scheduling of transmission resource, and transmission format of channel of occupying transmission resource in control channel; And, receiving correlatively in selectively configured channel. Alternatively, second communication unit 32 sends a leader sequence; receiving a part of information of indicating current physical frame structure in system information channel, wherein including at least duration of the control channel, receiving another part of information of indicating current physical frame structure in control channel, transmitting information of indicating allocation and scheduling of transmission resource, and transmission format of channel of occupying transmission resource in control channel; and, receiving correlatively in selectively configured channel.

As can be seen, in an embodiment of this present invention, network device configuring current physical frame structure in accordance with scheduling of transmission resources, and sending information of indicating current physical frame structure in current physical, terminal device may determine current physical frame structure according to information of indicating current physical frame structure.

For example, supposing network device is a CAP, terminal device is a STA. embodiment of this present invention, CAP can send information of indicating current physical frame structure in two ways.

Mode A: In system information channel, transmitting information of indicating current physical frame structure.

Information of indicating current physical frame structure, comprising one or several of following: information of indicating channel presence, information of indicating presence and duration of channel and information of indicating duration of channel.

STA associated with CAP parses information of indicating current physical frame structure in system information channel, can determine duration of current physical frame, adding duration of each channel in current physical frame, obtaining length of current physical frame.

Optionally, CAP may also send frame length information of current physical frame in system information channel, at this time, a STA associated with the CAP may directly determine frame length of current physical frame, do not need to compute.

Mode B: In system information channel and control channel, transmitting information of indicating current physical frame structure.

Information of indicating current physical frame structure, comprising one or several of following: information of indicating channel presence, information of indicating presence and duration of channel and information of indicating duration of channel.

CAP sends a part of information indicating current physical frame structure in system information channel, this part of the information includes at least duration of control channel, transmitting another part of information of indicating current physical frame structure in a control channel.

STA associated with CAP parses information of current physical frame structure, can determine duration of current physical frame, adding duration of each channel in current physical frame, obtaining length of current physical frame.

Further, CAP may also send frame length information of current physical frame in system information channel, at this time, a STA associated with the CAP may directly determine frame length of current physical frame, do not need to compute. Alternatively, CAP may also transmitting frame length information of current physical frame structure in system information channel and control channel, at this time, a STA associated with the CAP add two-part frame length in system information channel and control channel, obtaining length of current physical frame.

Several specific embodiments are given below, for example, process CQI feedback of downlink and CSI feedback of downlink by uplink transmission channel.

Embodiment 1

Figure 4:
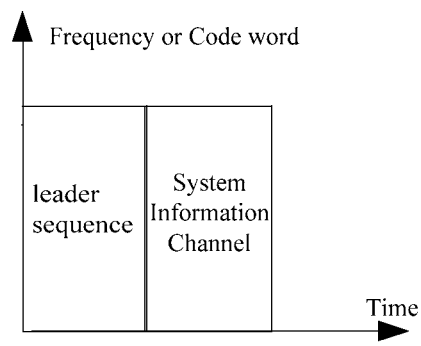
FIG. 4 is a structure diagram of physical frame in first embodiment of this present invention.

FIG. 4 is an embodiment of the present invention a physical frame structure diagram, wherein the abscissa represents time, the ordinate represents frequency or code, in the physical frame includes a preamble sequence and a system information channel.

CAP perform following operations: transmitting a preamble sequence; and, transmitting information of indicating current physical frame structure in system information channel.

In embodiment 1, system information channel comprises following fields:

(1) The control channel duration indication field, indicating duration of the control channel, control channel duration indicator fields may be 6 bits, maximum indication 63 OFDM symbols, 1 OFDM symbols is a minimum resource allocation unit. For example: if this 6 bits is 010000, is converted to a decimal number is 16, corresponding 16 OFDM symbols.

(2) The downlink transmission channel duration indication field, indicates the duration of downlink transport channels, downlink transmission channel indication of duration fields may be 9 bits, maximum indication 511 OFDM symbols. For example: if this 9 bits is 100000000, is converted to a decimal number is 256, corresponding 256 OFDM symbols.

(3) The uplink transmission channel duration indication field, indicating uplink transport channel period, uplink transmission channel indication of duration fields may be 9 bits, maximum may indicate 511 OFDM symbols.

(4) The downlink probing channel configuration field, indicating presence of downlink probing channel. This embodiment, duration of downlink probing channel is fixed, downlink channel allocation field may be 1 bit, when bit indicating presence of downlink probing channel, equivalent to indirectly indicates that downlink probing channel is a fixed time period.

(5) The uplink probing channel configuration field, indicating presence and duration of uplink probing channel. The uplink probing channel configuration fields may be 2 bits, such as to fill into 00 indicates no uplink probing channel, The filled 01 indicating that uplink probing channel occupies 1 OFDM symbol, filled with 10 indicates uplink probing channel occupies 2 OFDM symbols, filling 11 indicates uplink probing channel occupies 4 OFDM symbols.

(6) The uplink scheduling request channel allocation field, indicates presence and duration of uplink scheduling request channel. The uplink scheduling request channel configuration fields may be 2 bits, such as to fill into 00 indicating no uplink scheduling request channel, filled 01 indicates uplink scheduling request channel occupies 1 OFDM symbol, filling 10 indicates uplink scheduling request channel occupies 2 OFDM symbols, filling 11 indicates uplink scheduling request channel occupies 4 OFDM symbols.

(7) The uplink random access channel configuration field, indicates presence of uplink random access channel. In embodiment No 1, duration of uplink random access channel is fixed, The uplink random access channel configuration fields may be 1 bit, when the bit indicates presence of an uplink random access channel, equivalent to indirectly indicates that the uplink random access channel is a fixed time period.

As can be seen, field (1)-(3) in system information channel, used for indicating channel duration information, field (4) and (7) used for indicating information of presence channel, field (5) and (6) used for indicating information of presence and duration of channel.

In other application scenarios, the downward acquisition channel and uplink random access channel also may not be a fixed period, at which time downlink probing channel configuration field and uplink random access channel configuration field, may also use of a multi-bit indicator channel presence and duration, or indexing channel duration information.

Since physical frame structure of this present embodiment No. 1 does not include a control channel, downlink transport channels, downlink probing channel, uplink transmission channels, uplink probing channel, uplink random access channel and uplink scheduling request channel, CAP in control channel indication of duration field, downlink transmission channel indication of duration field and uplink transmission channel indication of duration field, filling time length 0, in the downlink probing channel configuration field and uplink random access channel configuration field filling indicating an absence of channel value, in uplink probe channel configuration field and uplink scheduling request configuration field filling indicating an absence of channel value.

In this embodiment, leader sequence and system information channel in one duration predetermined, CAP and STA know the pre-set conditions, therefore resolution STA from a system information channel information indicates the current physical frame structure, A determination is made that the current only in physical frame includes a preamble sequence and system information channel, thereby determining that current physical frame does not perform transmitting operation, only correlation receiving operation is performed.

Example 2

Figure 5:
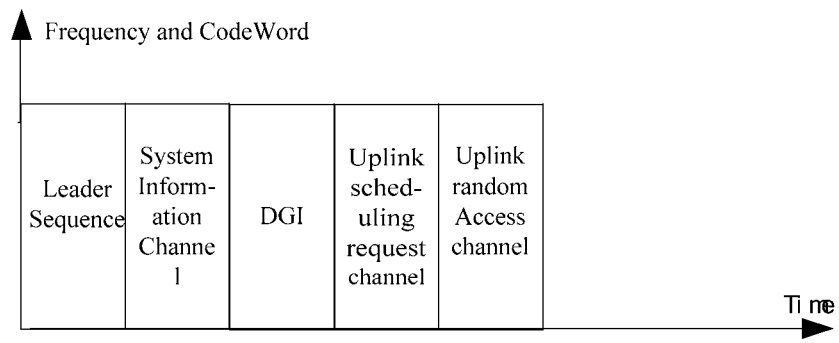
FIG. 5 is a structure diagram of physical frame in second embodiment of this present invention.

FIG. 5 is a second embodiment of present invention in physical frame structure diagram, wherein abscissa represents time, ordinate represents frequency or code, in physical frame includes a preamble sequence, a system information channel, downlink guard interval, uplink scheduling request channel and uplink random access channel.

CAP perform following operations: transmitting a preamble sequence; and, transmitting information of indicating current physical frame structure in system information channel.

As an alternative embodiment, in present embodiment 2, downlink guard interval duration, CAP may be carried in information of indicating current physical frame structure, when System information channel listed in Example 1, on the basis of the field, It is also possible to have a guard interval an indication field, the field may be used multiple bit indicates a downlink guard interval duration, or, in the case of guard interval has a fixed duration, this field can also be only 1 bit indicates presence of downlink guard interval.

As another alternative embodiment, downlink guard interval duration in present embodiment 2, CAP may also carried this guard interval duration in broadcast information (BCF) periodically broadcast in downlink transmission channel, with 2 bits in BCF indicates downlink guard interval duration, For example, value 0 indicates downlink guard interval of 2 OFDM symbols, taking value 1, indicates a downlink guard interval is 4 OFDM symbols. STA, during access wireless network of CAP, after access success by periodically verifying BCF known downlink guard interval duration, At this time, CAP need not in each physical frame indexes again downlink guard interval duration, savings in system information channel overhead.

STA determines that current physical frame structure, thereby besides correlatively receiving operation is performed, determining current physical frame, also is configured to selectively carry out transmitting operation:

In uplink random access channel to transmit a random access request sequence, thereby triggering CAP allocate resources for transmitting a random access request;

In uplink scheduling request channel uplink scheduling sequence, thereby triggering the CAP assign resource for transmitting uplink scheduling request; alternatively, in uplink scheduling request channel fast signaling feedback.

In embodiment 2, STA obtains transmission resources of uplink random access channel and uplink scheduling request channel through competition way, thus CAP need not be transmitted in a control channel resource indication to the two channels, may not be configured control channel.

Alternatively, in present embodiment 2, may only include one of uplink random access request channel and uplink scheduling request channel in physical frame structure.

Embodiment 3

The application scenario of the present embodiment is assumed to include: there are downlink traffic transmission needs from CAP to STA; channel probing should be performed before downlink traffic transmission; there are no requirements of uplink traffic, uplink signaling or downlink traffic feedback in STA.

Figure 6A:
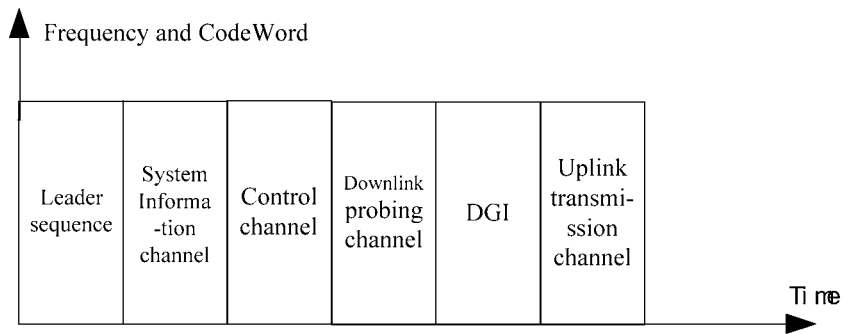
FIG. 6a is first kind structure diagram of first physical frame in third embodiment of this present invention.
Figure 6B:
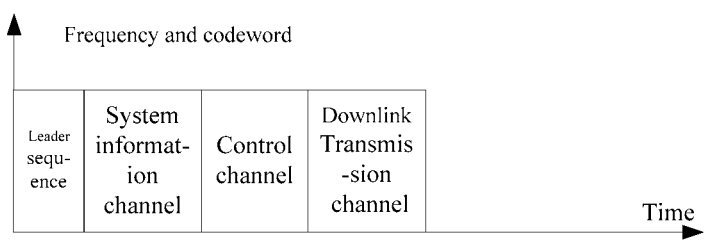
FIG. 6b is structure diagram of second physical fume in third embodiment of this present invention.

As a first alternative embodiment, two physical frames needed by CAP to accomplish downlink traffic transmission, as shown in FIGS. 6a and 6b, wherein abscissa represents time, ordinate represents frequency or code.

In the first physical frame, CAP to perform following transmission operation: transmitting a preamble sequence; and, transmitting information of indicating current physical frame structure in system information channel; and transmitting information of indicating allocation and scheduling of transmission resource, and transmission format of channel of occupying transmission resource in control channel; Transmitting downlink probing signal in downlink probing channel. STA determining first physical frame structure by information of indicating current physical frame structure, and thereby determining first physical frame may perform following operation:

Feedback downlink channel measurements to CAP in uplink transmission channel. Here, downlink channel measurements, obtained in STA through performing measurement on downlink channel based on downlink probing signals transmitted by CAP, comprises a downlink CQI, or, comprises CQI of downlink and CSI of downlink. In the second physical frame, CAP perform transmission operation: transmitting a preamble sequence; and, in system information channel information indicates the current physical frame structure; and, transmitted in a control channel indicating a transmission resource allocation and scheduling, And occupy the transmission resource of channel information of transmission format; as, in downlink transport channel transmits downlink traffic data.

STA information by indicating the current physical frame structure, determine the second physical frame structure, and thereby determining the second physical frame sending is not performed in operation.

Figure 7:
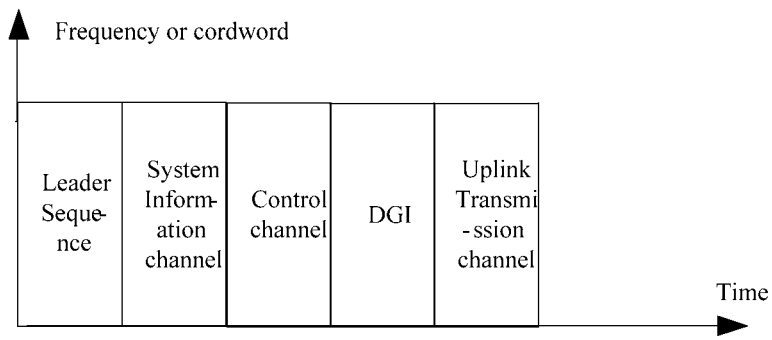
FIG. 7 is second kind structure diagram of first physical frame in third embodiment of this present invention.

As a second alternative embodiment, CAP need is accomplished by two physical frames downlink traffic transmission, as shown in FIG. 7 and FIG. 6b, wherein the abscissa represents time, the ordinate represents frequency or code.

In the first physical frame, CAP to perform transmission operation: transmitting a preamble sequence; and, transmitting information of indicating current physical frame structure in system information channel; and transmitting information of indicating allocation and scheduling of transmission resource, and transmission format of channel of occupying transmission resource in control channel.

STA determines that first physical frame structure, and thereby determining the first physical frame that performs transmitting operation:

STA transmits uplink probing signal to CAP in uplink probing channel, enable the CAP to utilize the uplink probing signal for taking uplink channel quality measurements, or taking measurement on uplink channel quality and uplink channel status, And, according to principles of uplink and downlink reciprocity, obtain downlink channel CQI, or obtain downlink channel CQI and CSI.

In the first physical frame, CAP to perform transmission operation: transmitting a preamble sequence; and, transmitting information of indicating current physical frame structure in system information channel; and transmitting information of indicating allocation and scheduling of transmission resource, and transmission format of channel of occupying transmission resource in control channel; transmitting downlink traffic data in downlink transport channel.

STA determines the second physical frame structure through information of indicating current physical frame structure, and thereby determining that do not perform transmitting operation in the second physical frame.

In above two embodiments, illustrating from CAP and STA performing transmission operation, when CAP transmit, STA will perform relevant receiving, when STA transmit, CAP will perform relevant receiving.

In the above two embodiments, CAP may indicates a downlink guard interval by two alternative solutions identical to Example 2, wherein using a first solution, system information channel listed in Example 1, on the basis of the field may also have a guard interval indication field, This field can be used multiple bit indicates a downlink guard interval duration, or, in the case of guard interval has a fixed duration, this field can also be only 1 bit indicates a downlink presence; Guard interval in second solution, system information channel having in the same field.

In above two embodiments, if CAP employed second solution in described above embodiment, sending information of indicating current physical frame structure, the second physical frame as an example, filled with corresponding value in system information channel control channel duration field, indicated with 9 bits in a control channel duration of downlink transport channels.

In above two embodiments, if CAP do not perform channel probing before downlink traffic transmission, downlink traffic transmission is completed may be as shown through one physical frame shown in FIG. 6b.

In both embodiments 1 and 2, first physical frame and second physical frame may be continuous or discontinuous.

In addition to above two embodiments, before transmitting downlink traffic, also simultaneously perform channel probing based on downlink probing channel and uplink probing channel, simultaneously configure downlink probing channels, uplink probing channel and uplink transport channel in first physical frame, CAP utilize uplink probing signal sent by STA to take measurement on uplink channel status, according to principles of uplink and downlink reciprocity, obtain downlink channel CQI; or CAP utilize uplink probing signal sent by STA to take measurement on uplink channel quality, according to principles of uplink and downlink reciprocity, obtain downlink channel CQI; Receiving CSI of downlink feedback from STA in uplink transmission channel.

The two embodiments described above, to complete in one physical frame in channel probing is exemplified, in actual applications, may also be accomplished by more physical frame channel probing, their explanation has been omitted.

Embodiment 4

It is assumed that application scenarios in embodiment 4 include:

There are uplink traffic transmission needs in STA; channel probing should be performed before uplink traffic transmission; there are no requirements of downlink traffic, downlink signaling or uplink traffic feedback in CAP.

Figure 8:
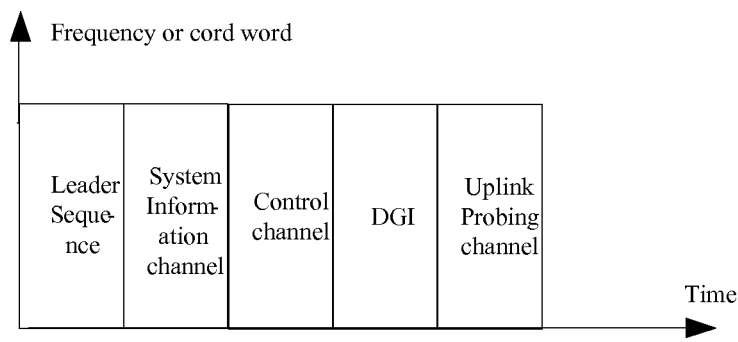
FIG. 8 is a structure diagram of second physical frame in fourth embodiment of this present invention.

As a first alternative embodiment, known STA with uplink traffic transmission needs in CAP, uplink transmission accomplished in STA two physical frames needed, as shown in FIGS. 7 and 8, wherein abscissa represents time, ordinate represents frequency or code.

In the first physical frame, CAP to perform the transmission operation: transmitting a preamble sequence; and, in system information channel information indicates the current physical frame structure; and, transmitted in a control channel indicating a transmission resource allocation and scheduling, and occupy the transmission resource of channel information of the transmission format.

STA determines that the current physical frame structure, and thereby determining the first physical frame that performs transmitting operation:

In the uplink probing channel to CAP transmit uplink probe, such that the CAP using the uplink probing signal for uplink channel quality measurement, obtain an uplink CQI, or uplink channel quality and uplink channel state measurements, uplink CQI and CSI.

In the second physical frame, CAP to perform the transmission operation: transmitting a preamble sequence; and, in system information channel information indicates the current physical frame structure; and, transmitted in a control channel indicating a transmission resource allocation and scheduling, and occupy the transmission resource of channel information of the transmission format.

STA determines that the current physical frame structure, and thereby determining the second physical frame that performs the transmitting operation in:

In the uplink transport channel transmits uplink traffic data. As a second alternative embodiment, in CAP known STA with uplink traffic demand, STA need is accomplished by two physical frames of uplink transmission, as shown in FIGS. 6a and 8, wherein the abscissa represents time, the ordinate represents frequency or code.

In the first physical frame, CAP perform transmission operation: transmitting a preamble sequence; and, transmitting information of indicating current physical frame structure in system information channel; and transmitting information of indicating allocation and scheduling of transmission resource, and transmission format of channel of occupying transmission resource in control channel.

STA determines that the current physical frame structure, and thereby determining the first physical frame that performs transmitting operation:

Transmit CQI of downlink to CAP In the uplink channel, or Transmit CQI and CSI of downlink. According to principles of uplink and downlink reciprocity, obtain CQI and CSI of uplink.

In second physical frame, CAP perform transmission operation: transmitting a preamble sequence; and, transmitting information of indicating current physical frame structure in system information channel; and transmitting information of indicating allocation and scheduling of transmission resource, and transmission format of channel of occupying transmission resource in control channel.

STA determines that current physical frame structure, and thereby determining to perform transmitting operation in second physical frame:

Transmitting uplink traffic data in uplink transport channel.

In above two embodiments, illustrating from CAP and STA performing transmission operation, when CAP transmit, STA will perform relevant receiving, when STA transmit, CAP will perform relevant receiving.

In the above two embodiments, CAP may indicates a downlink guard interval by two alternative solutions identical to Example 2, wherein using a first solution, system information channel listed in Example 1, on the basis of the field may also have a guard interval indication field, This field can be used multiple bit indicates a downlink guard interval duration, or, in the case of guard interval has a fixed duration, this field can also be only 1 bit indicates a downlink presence; Guard interval in second solution, system information channel having in the same field. In above two embodiments, if CAP employed second solution in described above embodiment, sending information of indicating current physical frame structure, the second physical frame as an example, filled with corresponding value in system information channel control channel duration field, indicated with 9 bits in a control channel duration of uplink transport channels.

In above two embodiments, if CAP do not perform channel probing before uplink traffic transmission, uplink traffic transmission is completed may be as shown through one physical frame shown in FIG. 8.

In addition to the above two embodiments, CAP may also simultaneously configure downlink probing channels, uplink probing channel and uplink transport channel in first physical frame, at this time, CAP utilize uplink probing signal sent by STA, in uplink probing channel of first physical frame, to take measurement on uplink channel status, obtain CSI of uplink, Receiving CQI of downlink feedback from STA in uplink transmission channel of first physical frame, according to principles of reciprocity between uplink and downlink, obtain CQI of uplink; Or, CAP utilize uplink probing signal sent by STA, in uplink probing channel of first physical frame, to take measurement on uplink channel quality, obtain CQI of uplink, Receiving CSI of downlink feedback from STA in uplink transmission channel of first physical frame, according to principles of uplink and downlink reciprocity, obtain CSI of uplink.

The two embodiments described above, to complete in one physical frame in channel probing is exemplified, in actual applications, may also be accomplished by more physical frame channel probing, their explanation has been omitted.

The above embodiments 1 to 4, for the simplest application scenarios, cite a few possible physical frame structure, it is intended to be illustrative correlation between physical frame transmission channel and corresponding probing channel in embodiments of present invention, and the actual application scenarios may be much more Complicated, For example, there are multiple STA in system, CAP and each STA has a different transmission requirements, whether supports channel probing based on the STA, some uplink and downlink transmission need to perform channel probing prior to uplink and downlink transmission, some may not require channel probing, in other application scenarios possibly configured physical frame structure respectively are given in following embodiments 5 to 10.

Embodiment 5

Figure 9:
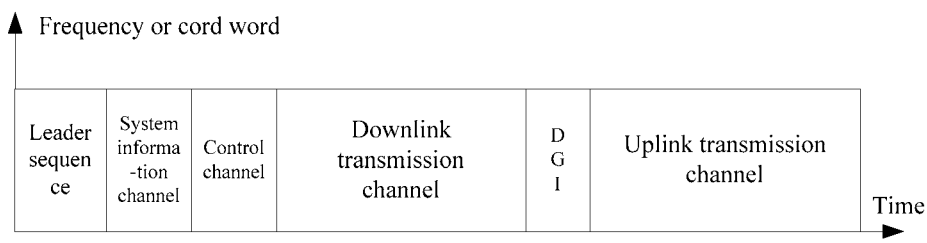
FIG. 9 is a structure diagram of physical frame in 5th embodiment of this present invention.

FIG. 9 is a structure diagram of physical frame in 5th embodiment of this present invention.

As shown in FIG. 9, the physical frame include downlink sub-frame and uplink sub-frame, downlink frame includes a preamble sequence, a system information channel, control channel and downlink transmission channel, uplink frame includes uplink transport channel.

Each STA may share uplink transmission resources by time division, frequency division, code division, spatial division or multiplexed manner as described above.

An alternative embodiment, CAP may transmit information of indicating current physical frame structure in system information channel, exemplified as follows:

Indicate duration of control channel with 6 bits, the 6 bits maximum may indicate 63 OFDM symbols. For example: if this 6 bits is 010000, is converted to a decimal number is 16, corresponds 16 OFDM symbols.

In system information channel, utilizing 9 bits indicates a downlink transmission channel period, maximum 511 OFDM symbols. For example: if this 9 bits is 100000000, is converted to a decimal number is 256, corresponding 256 OFDM symbols.

In the channel, indicate duration of uplink transmission channel with 9 bits, maximum 511 OFDM symbols.

In system information channel, 1 bit may be used for indicating guard interval, 1 OFDM symbols in all. Alternatively, system information channel does not indicate guard interval, but guard interval have been configured in system. Another alternative embodiment, CAP may also transmit information of indicating current physical frame structure in system information channel and control channel, exemplified as follows:

In system information channel, transmitting control channel duration with 6 bits; in the control channel, transmitting downlink transmission channel duration with 9 bits, and transmitting uplink transmission channel duration with 9 bits.

Based on physical frame structure of FIG. 9, signaling can be separated with traffic in uplink and downlink transmission.

Embodiment 6

Figure 10:
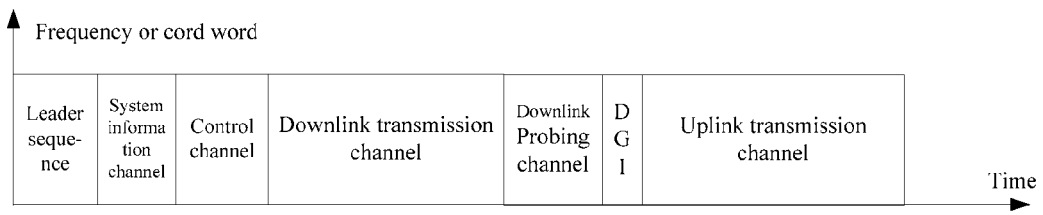
FIG. 10 is a structure diagram of physical frame in 6th embodiment of this present invention.

FIG. 10 is a structure diagram of physical frame in the 6th embodiment of this present invention.

As shown in FIG. 10, on the basis of FIG. 9, downlink probing channel is configured in downlink sub-frame. Presence information of downlink probing channel is included in information of indicating current physical frame structure sent by CAP, can be realized with 1 bit, it is transmitted in a system information channel. As shown in FIG. 10, downlink probing channel may be located behind downlink transport channel.

Embodiment 7

Figure 11:
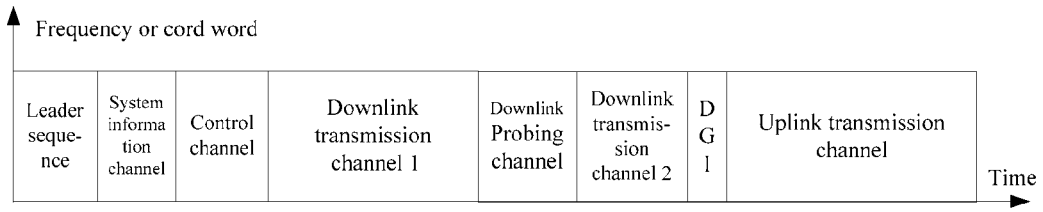
FIG. 11 is a structure diagram of physical frame in 7th embodiment of this present invention.

FIG. 11 is a structure diagram of physical frame in 7th embodiment of this present invention. Downlink probing channel is located in middle of downlink transport channel.

In Multi-User-Multiple-Input and Multiple-Output (MU-MIMO) transmission scheme, because downlink MU-MIMO system performance not only delay sensitive to downlink channel state information, and multi-user MIMO may involve larger signal processing complexity. Taken channel state information delay, and potentially different hardware processing complexity at different application scenarios, downlink probing channel located in middle of downlink transport channel is more reasonable. If position of downlink probing channel is fixed, may be used 1 bit to indicate presence of downlink probing channel in system information channel. If there are STAs with different processing capabilities in system, position of downlink probing channel is variable. At this time, in a system information channel, not only requires to indicate presence of downlink probing channel, but also requires indicate duration of two downlink transport channels in FIG. 11. Indicating duration of two downlink transport channels may employ following three methods:

Respectively indicate duration of downlink transport channel 1 and downlink channel 2;

Respectively indicates total duration of downlink transport channel and duration of downlink transmission channels 1;

Respectively indicates total duration of downlink transport channel and duration of downlink transmission channels 2.

By configuring downlink probing channel position dynamic or semi-static above-mentioned, provide sufficient processing time for devices with different processing capacity.

An alternative embodiment, CAP transmits information of indicating current physical frame structure in system information channel, such as: using 6 bits to indicate control channel duration; indicates total duration of downlink transmission channel with 9 bits, indicates duration of downlink transmission channel 2 with 7 bits; indicates duration of uplink transmission channel with 9 bits; indicates downlink probing channel with 2 bits, respectively indicate: no detected downlink probing channel, downlink channel position 1, down probing channel position 2 and downlink probing channel position 3, matching for different Probing bandwidth. The downlink probing channel positions 1, 2, 3 are determined position defined by system.

Another alternative embodiment, CAP transmits information of indicating current physical frame structure in system information channel and control channel, for example: in system information channel, CAP use 6 bits to indicate control channel duration; control channel, indicates total duration of downlink transmission channel with 9 bits, indicates duration of downlink transmission channel 2 with 7 bits; indicates duration of uplink transmission channel with 9 bits; indicates position of downlink probing channel with 2 bits.

Embodiment 8

Figure 12:
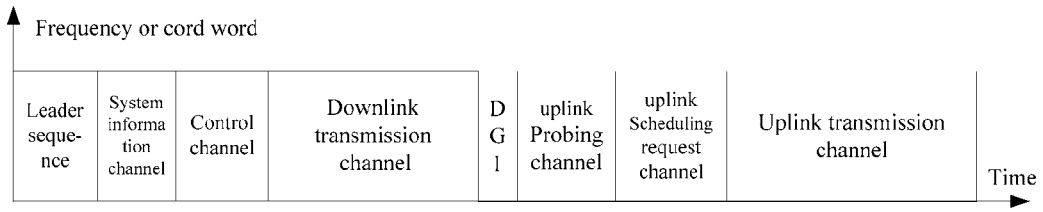
FIG. 12 is a structure diagram of physical frame in 8th embodiment of this present invention.

FIG. 12 is a structure diagram of physical frame in the 8th embodiment of this present invention.

This embodiment 8 places some supplemental channel in uplink frame, such as: uplink probing channel, uplink scheduling request channel and uplink random access channel in one or more disposed in uplink frame. FIG. 12 is only a frame structure including three auxiliary channels, in practice, depending on system application scene or scenario different, some auxiliary channel also can be disregarded.

An alternative embodiment, CAP may transmit information of indicating current physical frame structure in system information channel, for example, in a system information channel, indicate control channel duration with 6 bits; indicates downlink transport channel duration with 9 bits; indicates duration of uplink transmission channel 9 bits; indicate presence of uplink probing channel with 2 bits, respectively indicate 0, 1, 2, 4 OFDM symbols; indicates respectively presence and duration of uplink scheduling request channel with 2 bits, respectively indicate 1, 2, 3, 4 OFDM symbols; indicates presence of uplink random access channel with 1 bit, respectively indicate presence and absence two cases, if any, is fixed to 1 OFDM symbol.

An alternative embodiment, CAP may transmit information of indicating current physical frame structure in system information channel and control channel, for example:

In system information channel, indicate control channel duration with 6 bits; indicate presence of uplink random access channel with 1 bits;

In control channel, indicates duration of downlink transport channel with 9 bits; indicates duration of uplink transmission channel 9 bits; indicate presence and duration of uplink probing channel with 2 bits, presence and duration of uplink scheduling request channel with 2 bits.

Embodiment 9

Figure 13:
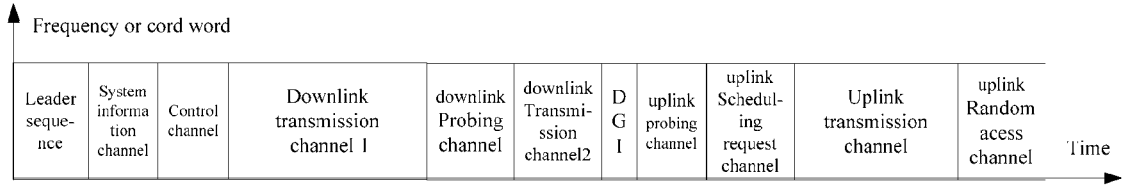
FIG. 13 is a structure diagram of physical frame in 9th embodiment of this present invention.

FIG. 13 is a structure diagram of physical frame in the 9th embodiment of this present invention In setting the downlink probing channel in the downlink sub-frame, and also setting the uplink probing channel in the uplink frame, uplink scheduling request channel and uplink random access channel. However, in practice, depending on system application scene or schemes of different, some auxiliary channel also can be disregarded.

Figure 14:
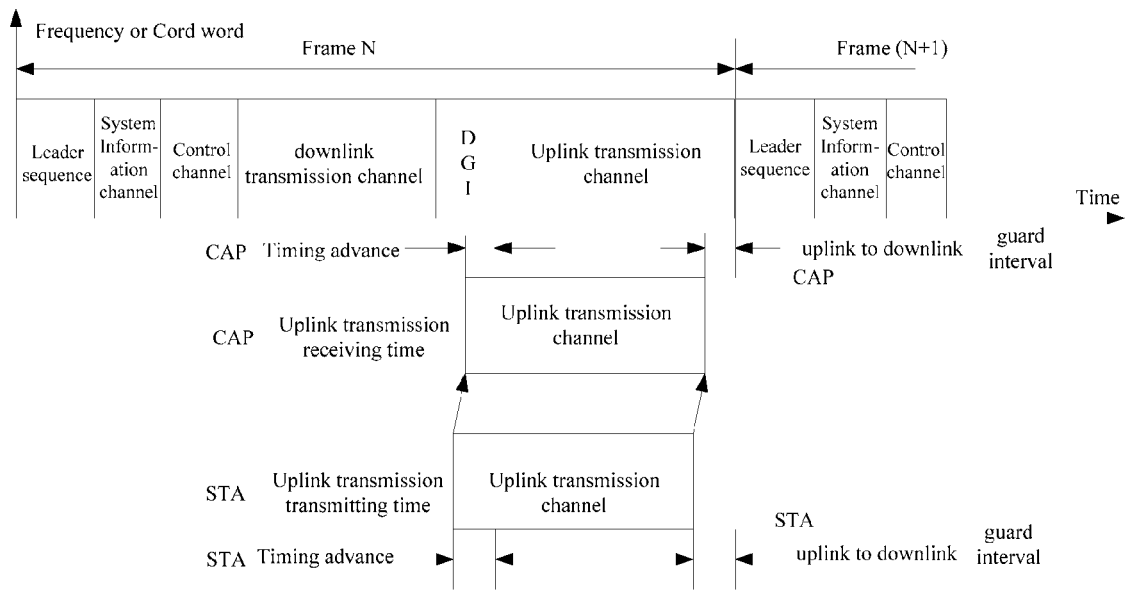
FIG. 14 is a schematic diagram of uplink guard interval reserved in advance by CAP transmitting according to this invention.

Alternatively, in above embodiment 1 to 9, uplink guard interval are reserved in advance by transmitting, i.e.: uplink transmit time advance, reserve guard interval of switching between downlink and uplink for CAP and STA, as shown in FIG. 14, during STA access network, CAP may inform time advance via resource indication transmitted in control channel, then during uplink transmit operation, STA perform transmitting in advance according to the time advance. Under the case of reserving guard interval through transmitting in advance, indicating downlink guard interval of convert form downlink to uplink, should not be less than guard time sum of maximum transceiver of downlink to uplink and transceiver of uplink to downlink between CAP and STA or STA and the said CAP.

Embodiment 10

Figure 15:
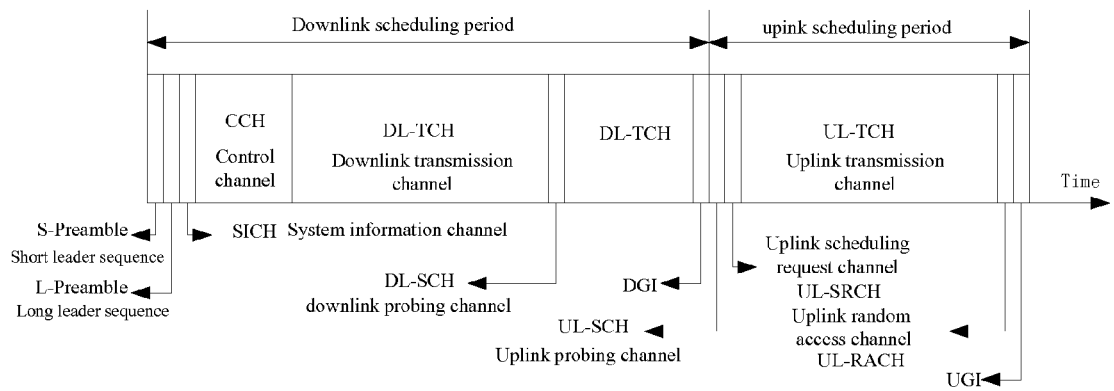
FIG. 15 is a structure diagram of physical frame in 10th embodiment of this present invention.

FIG. 15 is a structure diagram of physical frame in 10th embodiment of this present invention.

In current transmitted physical frame, CAP to perform following transmitting operation: transmitting leader sequence; and, transmitting information of indicating current physical frame structure in system information channel; and, transmitting information of indicating a transmission resource allocation and scheduling, and transmission format of channel of occupying transmission resource in control channel; and, transmitting one or several of downlink traffic data, downlink signaling and uplink traffic feedback in first downlink transport channel; and, transmitting downlink probing signal in downlink probing channel; and, transmitting one or more of downlink traffic data, downlink signaling and uplink traffic feedback in second downlink transmission channel.

STA determines current physical frame structure, and thereby determining that may perform following transmitting operation in current physical frame:

Transmitting uplink probing signal in uplink probing channel;

Initiating uplink scheduling request in uplink scheduling request channels;

transmits uplink traffic, and/or uplink signaling, and/or uplink feedback in uplink transport channel;

Initiating random access in uplink random access channel.

Alternatively, uplink guard interval and downlink guard interval may indicate as similar to that of embodiment 2.

Figure 16:
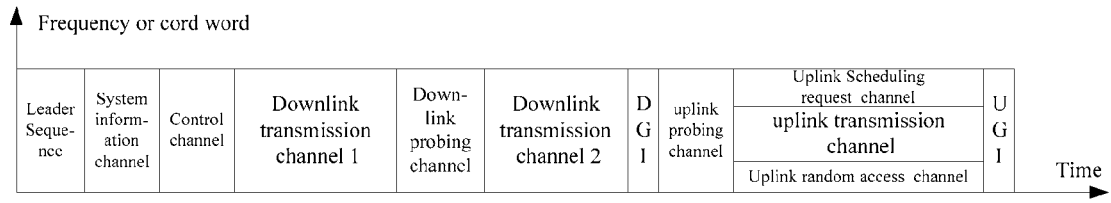
FIG. 16 is a schematic diagram of uplink transport channel, uplink scheduling request channel and uplink random access channel multiplexing resource.

In above embodiments, when uplink transport channel, uplink scheduling request channel and uplink random access channel are present in physical frame, The uplink transmission channel, uplink scheduling request channel and uplink random access channel multiplex resources by one way or combination of time division multiplexing, frequency division multiplexing, code-division multiple access, implement physical frame structure in embodiment 10 as an example, it is an example of such multiplexing scenarios in FIG. 16. This multiplexing may be preset and both of CAP and STA know, at this time, do not need to indicate multiplexed manner in the physical frame, or may be indicated by control channel, for example, indicates number of subcarriers occupied by uplink scheduling request channel in uplink transport channel with 4 bit, The maximum is 16 subcarriers, in uplink transmission channel upper sideband edge; with 4 bit indicates number of subcarriers occupied by uplink random access channel in uplink transport channel, the maximum is 16 subcarriers, in the uplink transmission channel lower sideband edge.

Figure 17:
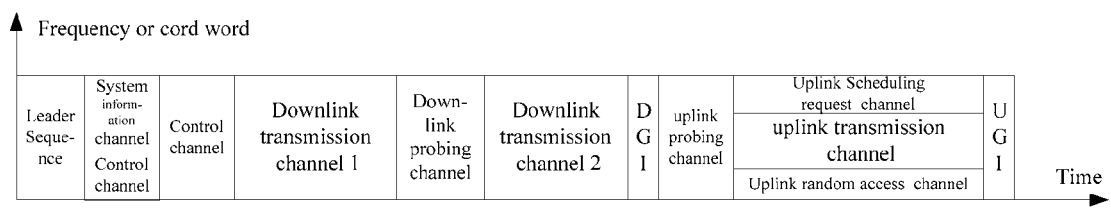
FIG. 17 is schematic diagram of control channel and system information channel multiplexing resource.

Further, when there are control channel and system information channel in physical frame, control channel and system information channel may multiplexing resources by one way or combination of time division multiplexing, frequency division multiplex, code division multiple access, implement physical frame structure in embodiment 10 as an example, it is an example of such multiplexing scenarios in FIG. 17. This multiplexing may be preset and both of CAP and STA know, at this time, do not need to indicate multiplexed manner in the physical frame, or may be indicated by control channel. The control and system information channel may also multiplex resources through employing only frequency division.

In addition, resources allocated for each STA in same channel may also share transmission resources using one or more combination multiplexing manner of time division, frequency division, code division and space division.

Embodiment 11

Information of indicating current physical frame structure comprises: information for indicating presence of first channel. Information of indicating presence of first channel carried in at least one channel of physical frame.

An alternative embodiment, first channel is downlink probing channel.

In this basis, information of indicating current physical frame structure further comprises: information for indicating duration of second channel. Information for indicating duration of second channel carried in at least one channel of physical frame. Second channel is possibly a downlink transmission channel or uplink transmission channel.

In alternative embodiment, when uplink transmission demand is present, may perform downlink channel probing first, then according to reciprocity between uplink and downlink, obtain measurements results of uplink channel, there is downlink transmission need, may perform downlink channel probing first, obtain directly downlink channel measurements results.

In another alternative embodiment, first channel is an uplink random access channel.

Embodiment 12

Information of indicating current physical frame structure comprising: information about presence and duration of first channel information. The presence and duration of first channel carried in at least one channel of physical frame.

In one alternative embodiment, first channel is an uplink schedule request channel.

Another alternative embodiment, first channel is an uplink probing channels.

In this basis, information of indicating current physical frame structure further comprising: information for indicating duration of second channel. information for indicating duration of second channel carried in at least one channel of physical frame. The second channel is an uplink transmission channel or downlink transmission channel.

In alternative embodiment, when downlink transmission demand is present, may perform uplink channel probing first, then according to reciprocity between uplink and downlink, obtain measurements results of downlink channel, there is uplink transmission need, may perform uplink channel probing first, obtain directly uplink channel measurements results.

Embodiment 13

Information of indicating current physical frame structure comprises: information for indicating duration of first channel, said duration is greater than or equal to zero. Information for indicating duration of first channel carried in at least one channel physical frame.

In first alternative embodiment, the first channel is control channel used for indicating allocation and scheduling of transmission resource, and transport format of occupying transmission channel resource.

In second alternative embodiment, the first channel is downlink transmission channel.

In this basis, information of indicating current physical frame structure further comprises: information of indicating presence and duration of the second channel. Information of indicating presence and duration of second channel, carried in at least one channel of physical frame. The second channel is uplink probing channel for transmitting uplink probing signal.

In this alternative embodiment, when there is downlink transmission need, may perform uplink channel probing first, and obtain downlink channel measurements based-on reciprocity between uplink and downlink.

The third alternative embodiment, the first channel is downlink transmission channel. In this basis, information of indicating current physical frame structure further comprises: information for indicating presence of second channel. Information for indicating presence of second channel carried in at least one channel of physical frame. The second channel is downlink probing channel used for transmitting downlink probing signal.

In this alternative embodiment, when there is downlink transmission need, may perform downlink channel measurement first, obtain downlink channel measurements results.

A fourth alternative embodiment, the first channel is uplink transmission channel.

In this basis, information of indicating current physical frame structure further comprises: information for indicating presence and duration of the second channel. The information of indicating presence and duration of second channel carried in at least one channel physical frame. The second channel is uplink probing channel for transmitting uplink probing signal.

In this alternative embodiment, when there is an uplink transmission needs, may perform uplink channel probing, obtain measurement results on uplink channel probing.

The fifth alternative embodiment, the first channel is uplink transmission channel. In this basis, information of indicating current physical frame structure further comprises: information for indicating presence of second channel. Information for indicating presence of second channel carried in at least one channel of physical frame. The second channel is downlink probing channel used for transmitting downlink probing signal.

In this alternative embodiment, when there is uplink transmission need, may perform downlink channel probing first, and obtain uplink channel measurements based-on uplink and downlink reciprocity.

Resource scheduling method of this invention will be given below, after implementing resource scheduling, physical frame structure can be determined based on scheduled transmission resources.

Figure 18:
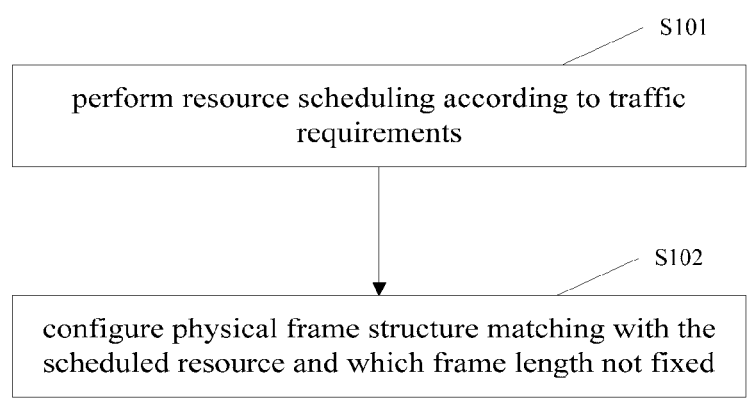
FIG. 18 is a flow chart of a method of resource scheduling in an embodiment of the present invention.

FIG. 18 is a flow chart of a method of resource scheduling in an embodiment of present invention, this process comprises:

Step S101: perform resource scheduling according to traffic requirements;

Step S102: configure physical frame structure matching with the scheduled resource and which frame length not fixed.

This method according to present invention there is no waste of radio resources caused by contention conflicts or random back off. Different from conventional mobile communication system (including: LTE, WiMax, etc. next generation mobile communication system), The system radio resource of uplink and downlink can be dynamically partitioned based on traffic demand, dynamically adapt better to data traffic requirements with various species and different characteristics in future.

Reference will now be made in detail, how to perform resource scheduling depending on transmission need and to configure physical frame structure.

Embodiment 14

When there is a transmission need, dispatch corresponding transmission resources based on transmission demand, configure frame structure matching scheduled transmission resources. In an exemplary embodiment of present invention, transmitting needs carried by scheduling information, CAP obtaining and parsing scheduling information, get transmission needs, thereby accomplishing resource scheduling.

Wherein, said uplink transmission needs is obtained by CAP from STA. Specifically, CAP can obtain uplink transmission needs by following three ways:

First way: acquire an uplink transmission needs by request-response manner, in particular: STA initiates scheduling request, CAP allocated resource of feedback uplink transmission requirements for STA of, said STA feedback uplink transmission requirements in corresponding resource;

With the first way, then configure uplink scheduling request channel in physical frame structure, for STA sends uplink scheduling request to CAP, to request transmission resources for reporting to CAP uplink transmission requirements.

When uplink scheduling request channel is configured in physical frame structure, may dispatch exclusive uplink transmission resource for STA, for STA to initiate uplink scheduling in a non-competitive manner; may also dispatch shared uplink transmission resource for STA, for STA to initiate uplink scheduling in a competitive manner. That is, STA initiate scheduling request, may use uplink transmission request mechanism based on collision-free, or use contention-based uplink transmission request mechanism.

When uplink scheduling request channel is configured, calculate and configure duration of said uplink scheduling request channel according to number of STA associated with CAP. For example, may respectively allocate N uplink scheduling request channel for N STAs associated with CAP, each STA may initiate uplink scheduling request based on collision-free uplink transmission request mechanism in corresponding channel. Or It is alternatively possible to assign M uplink scheduling request channel for N STAs associated with CAP, M less than N, said N STA competes said M uplink scheduling request channels, to initiate uplink scheduling request.

In addition, uplink scheduling request channel may be designed, used for feedback switching value information, to achieve fast feedback.

The second way: acquire an uplink transmission requirements by polling way, in particular: CAP polling periodically each STA, receiving uplink transmission needs feedback from STA.

A third way: obtain uplink transmission needs by carrying report, in particular: when STA transmitting uplink traffic, enable transmission needs carried in data frame, send to CAP together with uplink traffic.

Wherein, said downlink transmission requirements is acquired from MAC layer or higher layer of CAP.

The transmission needs, according to transmission direction, can be divided into uplink transmission and downlink transmission needs. When uplink transmission time is present, dispatch uplink resources depending on uplink transmission needs, configure uplink transport channel which matches with scheduled uplink resource. When there is downlink transmission need, dispatch downlink resource depending upon said downlink transmission needs, then configure downlink transport channel matching with the scheduled downlink resource.

According to type of data being transmitted, the transmission requirements, can be divided into requirements, transmission of traffic data signaling transmission requirements, and feedback requirements etc.

Based on this, schedules uplink transmission resource according to uplink transmission needs, and may configuration matched uplink transport channel further comprises:

When uplink traffic transmitting demand is present, schedule uplink transmission resources for said uplink traffic, and configure uplink traffic transmission channels in physical frame structure. Duration of uplink traffic transmission channels are determined according to total required transmission resource for transmitting uplink traffic required by each STA associated with CAP.

When uplink signaling transmitting demand is present, schedule uplink transmission resources for said uplink signaling, and configure uplink signaling channels in said frame structure. Duration of uplink signaling channels are determined according to total required transmission resource for transmitting uplink signaling required by each STA associated with CAP.

When feedback demand of downlink traffic is present, schedule uplink transmission resources for said downlink traffic feedback, and configure downlink traffic feedback channels. Duration of downlink traffic feedback channels are determined according to total required transmission resource for downlink traffic feedback required by each STA associated with CAP.

If there are other uplink transmission needs, may increase corresponding channel in said uplink transport channel, present invention not described in detail here.

Based on this, scheduling downlink transmission resource according to downlink transmission needs, and configure matched downlink transmission channel may further include:

When downlink traffic transmitting demand is present, schedule downlink transmission resources for said downlink traffic, and configure downlink traffic transmission channels in said frame structure. Duration of downlink traffic transmission channels are determined according to total required transmission resource for transmitting downlink traffic required by each STA associated with CAP.

When downlink signaling transmitting demand is present, schedule downlink transmission resources for said downlink signaling, and configure downlink signaling channels in said frame structure. Duration of downlink signaling channels are determined according to total required transmission resource for transmitting downlink signaling required by each STA associated with CAP.

When feedback demand of uplink traffic is present, schedule downlink transmission resources for said uplink traffic feedback, and configure uplink traffic feedback channels. Duration of uplink traffic feedback channels are determined according to total required transmission resource for uplink traffic feedback required by each STA associated with CAP.

If there are other downlink transmission needs, may increase corresponding channel in the downlink transmission channel, present invention not described in detail here.

Preferably, when transmission resources are scheduled, also needs to take into consideration channel condition, so that resource scheduling more reasonable. perform resource allocation according to CQI, or perform resource allocation according to CQI and CSI. Wherein, H matrix of transmission channel (N×M order, N receive antennas, M transmit antennas), CSI is a transport channel therein), or transmission channel H matrix after SVD decomposition, V matrix (M×K order), or compression information of the V matrix; CQI includes one or more of the following information: SNR (signal-to-noise ratio) of transmission channel or SINR (Signal Interference Noise Ratio), MCS (modulation coding set of downlink transmission), Nss (spatial streams of downlink transmission), PMI (Pre-coding matrix set of downlink transmission) and other related measurement scale.

When capability of STA supports CAP obtaining CQI, CAP also acquires CQI, perform resource scheduling according to traffic requirements and CQI. When capability of STA supports CAP obtaining CQI and CSI, CAP acquires CQI and CSI, perform resource scheduling according to traffic requirements, CQI, CSI.

Where, said CQI is available CQI through measuring entire frequency band, may also be CQI through measuring portion of band. said CSI is available CSI through measuring entire frequency band, may also be CSI through measuring portion of band.

Give description on resource scheduling and physical frame structure configuration of invention as following respectively from uplink channel conditions and obtaining downlink channel condition:

At time of scheduling uplink transmission resource, perform resource scheduling according to uplink CQI. To acquire an uplink CQI, may employ the following design:

Mode I: Measure and calculate terms of uplink probing channel. That is, when there is need of scheduling uplink transmission resources, for example, when demand of transmitting uplink traffic, demand of transmitting uplink signaling or demand of feedback of downlink traffic is present, needs to dispatch resource for acquiring CQI of uplink, then configure uplink probing channel in physical frame structure, for STA to send uplink probing signal to CAP. When CAP dispatch uplink transmission resources, measure uplink signal by uplink probing channel, compute uplink CQI, perform resource scheduling combining calculated uplink CQI.

Mode II: using reciprocity between uplink and downlink of TDD system, based on system of reciprocity, CAP obtain uplink CQI with downlink CQI measured and fed by STA. That is, when there are uplink transmission requirements, also need to perform resource scheduling for acquiring CQI of uplink, and configure downlink probing channel and CQI feedback channel in said physical frame structure, the downlink probing channel for CAP to transmit STA downlink probing signal, said CQI feedback channel for STA feedback CAP calculated downlink CQI based on downlink probing signal; when CAP schedules uplink transmission resources in accordance with uplink transmission needs, based on reciprocity between uplink and downlink, determine uplink CQI according to downlink CQI feedback from STA, schedule uplink transmission resources in combination the uplink CQI.

At the time of scheduling uplink transmission resource, may also perform resource scheduling by CQI and CSI of uplink. To acquire an uplink CQI and uplink CSI, may employ following design:

Mode I: Measure and calculate terms of uplink probing channel. That is, when there is need of scheduling uplink transmission resources, for example, when demand of transmitting uplink traffic, demand of transmitting uplink signaling or feedback of downlink traffic is present, needs to dispatch resource for acquiring CQI of uplink, then configure uplink probing channel in physical frame structure, for STA to send uplink probing signal to CAP. When CAP dispatch uplink transmission resources, measurement uplink signal by uplink probing channel, compute uplink CQI and uplink CSI, perform resource scheduling combining calculated uplink CQI and uplink CSI.

Mode II: using reciprocity between uplink and downlink of TDD system, based on system of reciprocity, CAP obtain corresponding uplink CQI and uplink CSI with downlink CQI and downlink CSI measured and fed by STA. That is, when there are uplink transmission requirements, also need to perform resource scheduling for acquiring uplink CQI and uplink CSI, and configure downlink probing channel, CQI feedback channel and CSI feedback channel in said physical frame structure, the downlink probing channel for CAP to transmit STA downlink probing signal, said CQI feedback channel for STA feedback CAP calculated downlink CQI based on downlink probing signal; when CAP schedules uplink transmission resources in accordance with uplink transmission needs, based on reciprocity between uplink and downlink, determine uplink CQI according to downlink CQI feedback from STA, schedule uplink transmission resources in combination the uplink CQI and uplink CSI.

Mode III: CQI obtained by direct measurements, obtain CSI via utilizing system reciprocity; or CSI obtained by direct measurements, obtain CQI via utilizing system reciprocity, that is:

when there are uplink transmission requirements, also need to perform resource scheduling for acquiring uplink CQI and uplink CSI, and configure uplink probing channel, downlink probing channel and CQI feedback channel in said physical frame structure, said uplink probing channel used for STA to send uplink probing signal to CAP. The downlink probing channel for CAP to transmit STA downlink probing signal, said CQI feedback channel for STA feedback CAP calculated downlink CQI based on downlink probing signal; when schedules uplink transmission resources in accordance with uplink transmission needs, measurement uplink signal by uplink probing channel, compute uplink CSI, and based on reciprocity between uplink and downlink, determine uplink CQI according to downlink CQI feedback from STA, schedule uplink transmission resources in combination the uplink CQI and uplink CSI.

Alternatively, when there are uplink transmission requirements, also need to perform resource scheduling for acquiring uplink CQI and uplink CSI, and configure uplink probing channel, downlink probing channel and CSI feedback channel in said physical frame structure, said uplink probing channel used for STA to send uplink probing signal to CAP. The downlink probing channel for CAP to transmit STA downlink probing signal, said CSI feedback channel for STA feedback CAP calculated downlink CSI based on downlink probing signal; when schedules uplink transmission resources in accordance with uplink transmission needs, measurement uplink signal by uplink probing channel, compute uplink CSI, and based on reciprocity between uplink and downlink, determine uplink CSI according to downlink CSI feedback from STA, schedule uplink transmission resources in combination the uplink CQI and uplink CSI.

At the time of scheduling downlink transmission resources, perform resource scheduling based on downlink CQI. To obtain downlink CQI, may employ the following design:

Mode I: Using reciprocity between uplink and downlink of TDD system, CAP measured and computer downlink CQI. Specifically, when there are downlink transmission requirements, for example, when demand of transmitting downlink traffic, demand of transmitting downlink signaling or feedback of uplink traffic is present, also need to perform resource scheduling for acquiring CQI of downlink, and configure uplink probing channel, the uplink probing channel for STA to transmit CAP uplink probing signal, when CAP schedules downlink transmission resources, measurement uplink probing signal in uplink probing channel, compute uplink CQI, and based on reciprocity between uplink and downlink of TDD system, determine downlink CQI, perform resources scheduling in combination said downlink CQI.

Mode II: Measures downlink CQI by the STA, report measurement results to CAP by way of feedback, so that CAP obtain downlink CQI. In particular, it can be, when there are downlink transmission requirements, for example, when demand of transmitting uplink traffic, demand of transmitting uplink signaling or feedback of downlink traffic is present, also need to perform resource scheduling for acquiring CQI of uplink, and configure downlink probing channel and CQI feedback channel in said physical frame structure, the downlink probing channel used for CAP to transmit downlink probing signal to STA, said CQI feedback channel for STA feedback CAP calculated downlink CQI based on downlink probing signal; when schedules uplink transmission resources, perform resource scheduling according to downlink CQI feedback from STA.

Wherein, duration of uplink probing channel therein can be determined according to antenna total number STA who reported uplink probing signal.

At time of scheduling downlink transmission resources, may also resource scheduling based on the downlink CQI and CSI. To obtain downlink CQI and CSI, may employ the following design:

Mode I: Uplink and downlink reciprocity of the TDD system, may be utilized by the CAP works out downlink of CQI and CSI. In particular, it can be, when there is a need for transmission resources scheduling downlink when there is, for example, transmission of downlink traffic demands, the downlink signaling or feedback the uplink traffic demand, It is also necessary to obtain downlink CQI and a downlink CSI for resource scheduling, and thereby configure the uplink probing channel in the physical frame structure, for STA transmits to the CAP uplink probe. When the scheduling downlink transmission resources, by at the uplink probe channel measurement uplink probe, The calculated uplink CQI and uplink CSI, determined based on uplink and downlink reciprocity of the TDD system, downlink CQI and a downlink CSI, binding performed in the downlink CQI and a downlink CSI resource scheduling.

Mode II: may consist of a STA measures the downlink CQI and descending CSI, to CAP by way of feedback report measurement results, so that CAP downlink CQI and a downlink CSI is obtained. In particular, it can be, when there is a need for transmission resources scheduling downlink when there is, for example, transmission of downlink traffic demands, the downlink signaling or feedback the uplink traffic demand, It is also necessary to obtain CSI of the downlink CQI and a downlink resource scheduling, and is configured in the physical frame structure downlink probing channel, a CQI feedback channel, and a CSI feedback channel, said downlink probing channel for CAP transmits to the STA a downlink probe, The CQI feedback channel for STA CAP CQI; according to the downlink probe works out downlink the CSI feedback channel for STA CAP feedback based on the downlink probe works out downlink CSI. when the scheduling downlink transmission resources, based on the STA feedback of CSI of the downlink CQI and a downlink resource scheduling.

Preferably, after the STA received feedback CQI, may also incorporate resource allocation, computing the STA corresponding channel quality, e.g., if resource allocation scheme is a time division, frequency division, we can directly use STA feedback of downlink CQI and CSI for resource scheduling; If the resource allocation is spatial division, according to each STA feedback CSI computation each STA corresponding spatial division transmission interference, each STA to use feedback CQI is, remove the corresponding spatial interference. In addition, may be adjusted based on other factors for each STA processes the CQI feedback, for scheduling of resources for CQI.

The amount of data in triples: takes into account CQI smaller, CSI large in size, of downlink channel by STA meter accuracy better than by the CAP using the TDD channel precision system context reciprocity works out features, Taken together, after design by the CAP using the TDD system of reciprocity measure downlink CSI, up and down to conserve transmission bandwidth, From the STA measures the downlink CQI, to CAP by way of feedback report measurement results, so that CAP access to accurate CQI. In particular, it can be, when there is a need for transmission resources scheduling downlink when there is, for example, transmission of downlink traffic demands, the downlink signaling or feedback uplink traffic demand, needs to obtain a downlink CQI and a downlink resource scheduling, the CSI of, And is configured in the physical frame structure up probing channel, down to the probing channel and CQI feedback channel, the uplink probing channel for STA transmits to the CAP uplink probe; the detected downlink probing channel for CAP transmits to the STA a downlink signal, the CQI feedback channel for STA to CAP feedback based on the downlink probe signal measured downlink CQI. When scheduling downlink transmission resource, in accordance with transmission of downlink traffic demands, the downlink signaling and feedback the uplink traffic resource requirements in one or more of scheduling, in uplink probing channel measured uplink probe signal, compute the uplink CSI, based system uplink and downlink reciprocity, determination of descending CSI, according to the CQI of the downlink CSI and STA feedback of downlink scheduling a resource.

Preferably, after the STA received feedback CQI, may also incorporate resource allocation, computing the STA corresponding channel quality, e.g, if resource allocation scheme is a time division, frequency division, we can directly use STA feedback of downlink CQI and CSI for resource scheduling; if the resource allocation is spatial division, Then from each STA feedback CSI computation each STA corresponding spatial division transmission interference, each STA to use feedback CQI is, remove the corresponding spatial interference. In addition, may be adjusted based on other factors for each STA processes the CQI feedback, for scheduling of resources for CQI.

Preferably, if the current physical frame allows other STA access CAP, the STA access CAP scheduling resource, and is configured in the physical frame structure uplink random access channel, for establishing association STA access CAP, and CAP. The duration of the uplink random access channel for the intended maximum number of simultaneously initiating access of STA determined. If the current frame is no longer allow other STA access CAP, may no longer current frame configuration uplink random access channel.

Wherein, may be scheduled in two ways STA in the uplink sent on the probing channel uplink probe: CAP triggered, scheduling STA emitter-detector signal; after or when the CAP schedule once, over a period of time, the STA in the uplink probing channel periodically transmits detection signals.

Of these, the configuration of the CQI feedback channel and/or CSI feedback channel, configuring the CQI feedback channel in the uplink transport channel and/or CSI feedback channel, the CQI feedback channel and/or CSI feedback channel as part of uplink transport channels. CQI feedback channel may Alternatively, and/or CSI feedback channel is configured to independently to uplink transmission channels.

Preferably, also in a physical frame structure configuration control channel, for carrying the uplink transmission channel, downlink transmission channels, uplink to the probing channel, downlink probing channel, uplink scheduling request channel, uplink random access channel description information in one or more channels. Thus informed STA associated with the CAP channel in the physical frame structure of specific transmission resource allocation.

Where, the control channel consists of scheduling signalling, the description information is carried in the scheduling signaling. The scheduling signalling object for indicating resource scheduling, and transmission resources scheduled for the object; the subject may be one or a set of STA.

The control channel duration according to the CAP to each STA associated with it that scheduling signaling the desired total transmission resource determination. Each scheduling signaling summing the length of calculation, the control channel duration; Or, if the length of each signaling is fixed size, fixed length to downlink scheduling signaling with signaling control channel multiplying computation, the number of lengths of time.

In resource scheduling, such as a maximum carrier to interference ratio scheduling algorithm may be employed, Round Robin scheduling algorithm, proportional fair scheduling algorithm scheduling algorithms. The scheduling of resource type may be time, frequency, code and space division alone or in various combinations. Thus, configuration in the physical frame structure of each channel may be time division, frequency division, code division and space division alone or in various combinations of multiplexed resource.

Reference will now be to application Example 1 to 5 as following, performing resource scheduling according to demand and configuring frame structure will be described in detail.

APPLICATION EXAMPLE 1

Figure 19:
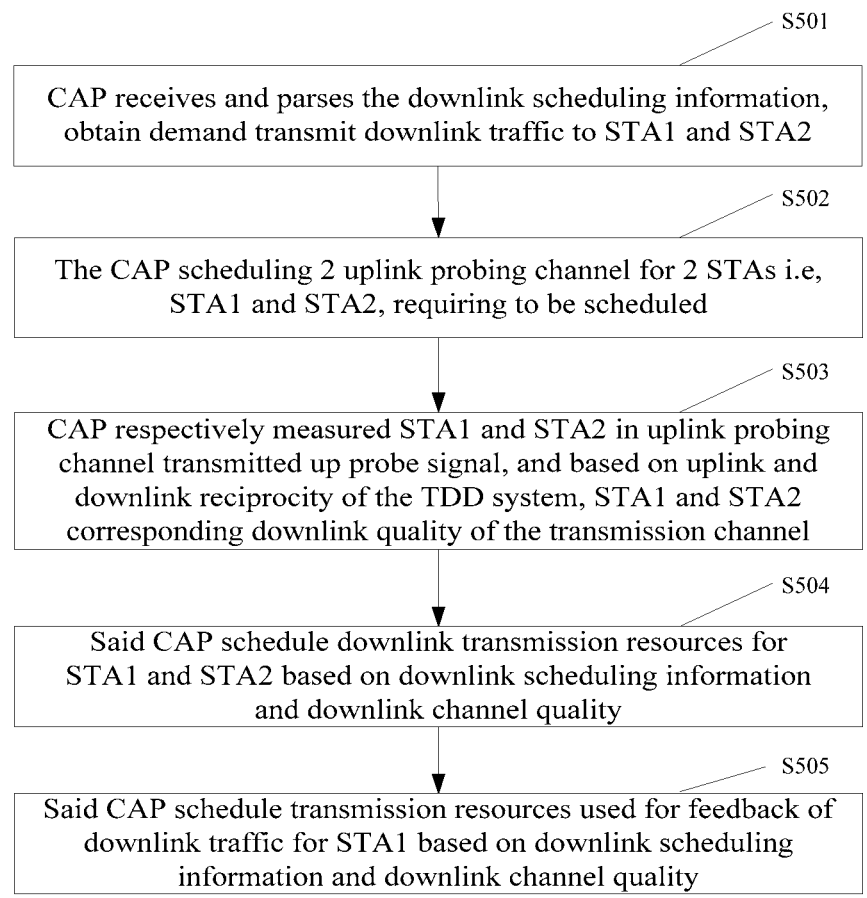
FIG. 19 is a flow chart of downlink scheduling and transmission process in first application examples of the present invention.

This embodiment provides a system-based context reciprocity, measured by uplink to the probing channel quality of the downlink channel condition, and thereby accomplishing downlink scheduling and transmission process, as shown in FIG. 19, includes the steps of:

Step S501: CAP receives and parses the downlink scheduling information, obtain demand transmit downlink traffic to STA1 and STA2;

The transmission of downlink traffic requirements include each STA or scheduling needs of STA different traffic flows, such as: traffic to be scheduled and queue length, different service quality of service QoS requirements, service priority, etc. The transmission of downlink traffic demand carried by the downlink scheduling information.

Step S502: The CAP scheduling 2 uplink probing channel for 2 STAs i.e, STA1 and STA2, requiring to be scheduled;

Step S503: the CAP respectively measured STA1 and STA2 in uplink probing channel transmitted up probe signal, and based on uplink and downlink reciprocity of the TDD system, STA1 and STA2 corresponding downlink quality of the transmission channel;

Step S504: Said CAP schedule downlink transmission resources for STA1 and STA2 based on downlink scheduling information and downlink channel quality;

Wherein, STA1 and STA2 share downlink transmission resources by time division multiplexing manner.

Step S505: Said CAP schedule transmission resources used for feedback of downlink traffic for STA1 based on downlink scheduling information and downlink channel quality.

STA2 perform downlink transmission and have not transmitted feedback ACK2 signaling in uplink, May be due to the following reasons: (1) STA2 downlink transmission at N frame perform feedback at N+k feedback; (2) downlink traffic in STA2 do not need feedback of ACK signaling.

The CAP configure frame structure which match with scheduled transmission resource, STA acquire frame structure by parsing system information channel, acquire specific transmission resource allocation by parsing the control channel.

Figure 20:
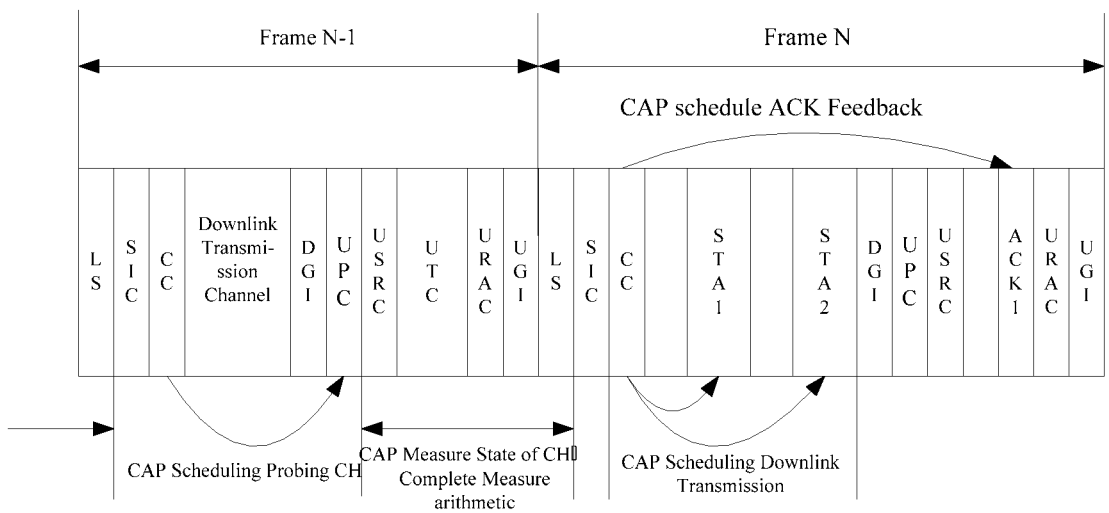
FIG. 20 is schematic of resource scheduling process in first application examples of the present invention.

To illustrate more graphically resource scheduling process in application example of present invention, see FIG. 20, is accomplished by 2 frames of scheduling process of downlink traffic transmission resource, and process of dynamically configuring frame structure according to the scheduled resources.

APPLICATION EXAMPLE 2

Figure 21:
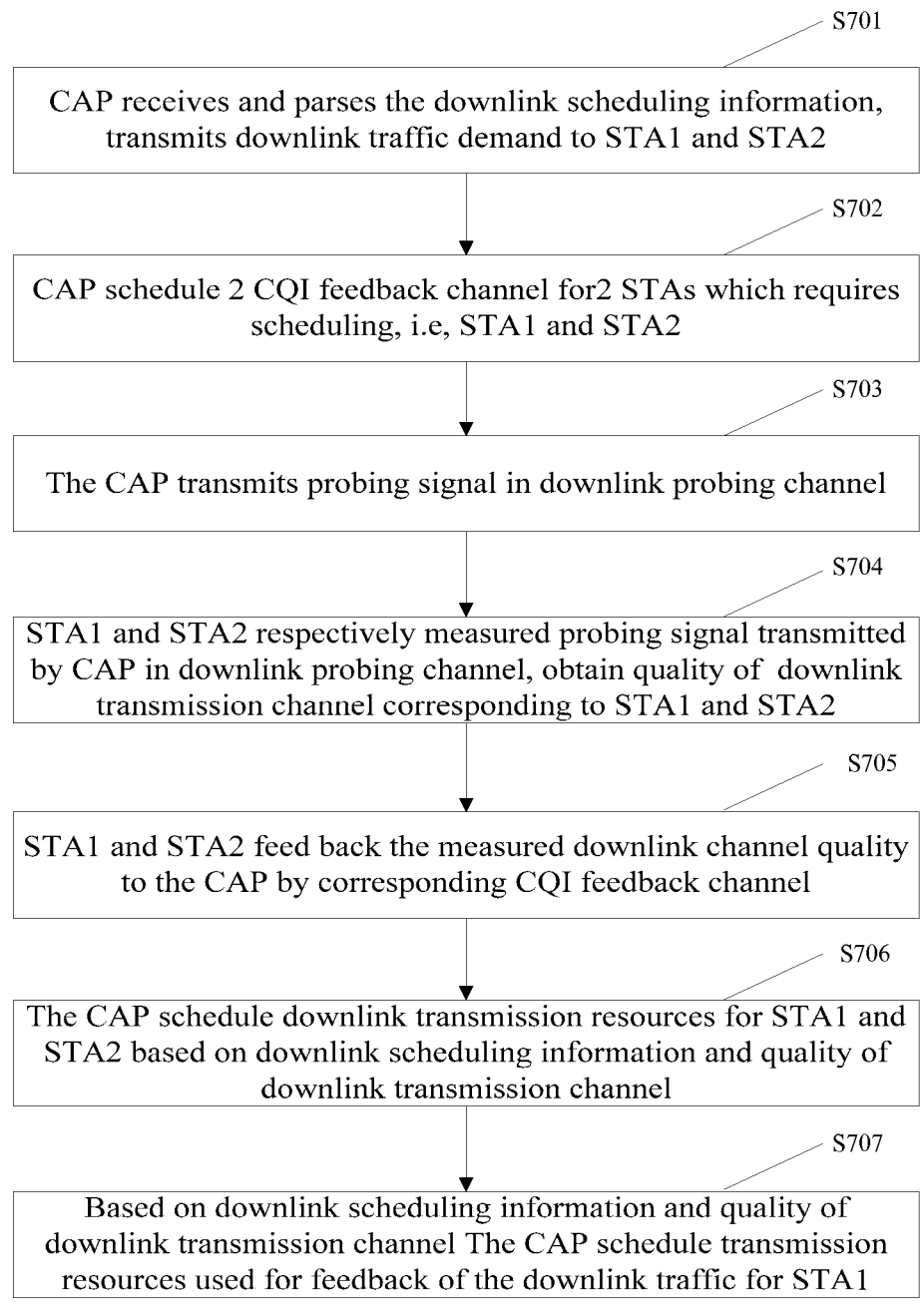
FIG. 21 is a flow chart of uplink scheduling and transmission process in second application examples of the present invention.

This embodiment provides a method of STA measures the channel quality information and feedback to the CAP, CAP accomplish uplink scheduling and transmission process according to fed-back channel quality information, as shown in FIG. 21, comprising following steps:

Step S701: CAP receives and parses the downlink scheduling information, transmits downlink traffic demand to STA1 and STA2;

Requirements for transmission of downlink traffic include each STA or scheduling needs of STA different traffic flows, such as: traffic and length of queue to be scheduled, requirements for quality of service QoS of different service, service priority, etc. The transmission of downlink traffic demand carried by the downlink scheduling information.

Step S702: The CAP schedule 2 CQI feedback channel for 2 STAs which requires scheduling, i.e, STA1 and STA2;

Step S703: The CAP transmits probing signal in downlink probing channel;

Steps S704: STA1 and STA2 respectively measured probing signal transmitted by CAP in downlink probing channel, obtain quality of the downlink transmission channel corresponding to STA1 and STA2;

Steps S705: STA1 and STA2 feed back the measured downlink channel quality to the CAP by corresponding CQI feedback channel;

Step S706: The CAP schedule downlink transmission resources for STA1 and STA2 based on downlink scheduling information and quality of downlink transmission channel;

Step S707: Based on downlink scheduling information and quality of downlink transmission channel The CAP schedule transmission resources used for feedback of the downlink traffic for STA1;

STA2 perform downlink transmission and have not transmitted feedback ACK2 signaling in uplink, May be due to the following reasons: (1) STA2 downlink transmission at N frame perform feedback at N+k feedback; (2) downlink traffic in STA2 do not need feedback of ACK signaling.

The CAP configure frame structure which match with scheduled transmission resource, STA acquire frame structure by parsing system information channel, acquire specific transmission resource allocation by parsing the control channel.

Figure 22:
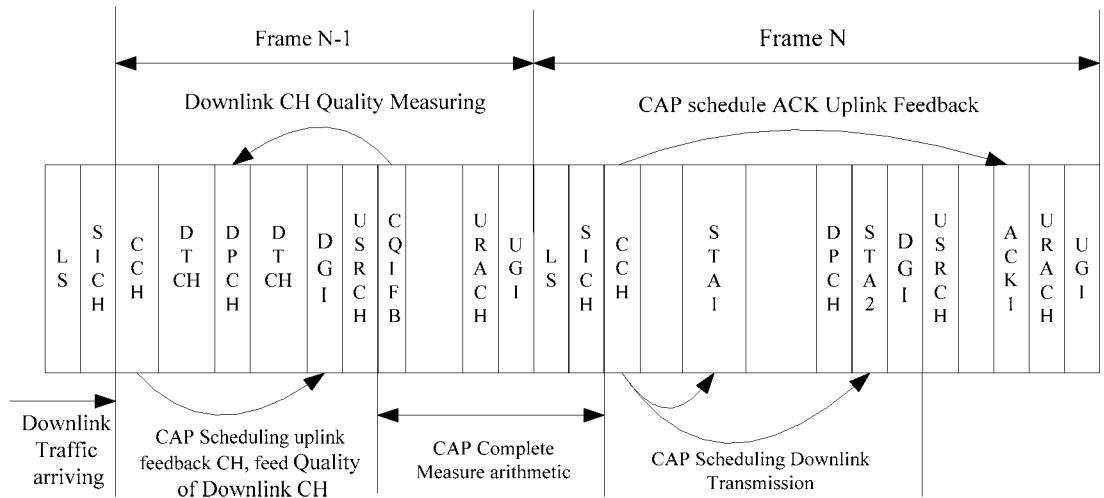
FIG. 22 is schematic of resource scheduling process in second application examples of this present invention.

To illustrate more graphically resource scheduling process in application example of present invention, see FIG. 22, is accomplished by 2 frames of scheduling process of downlink traffic transmission resource, and process of dynamically configuring frame structure according to the scheduled resources.

In application Example 1, since considering that obtain quality of down transmission channel according to TDD channel reciprocity between downlink and uplink requires uplink probing channel. But in application example 2, STA measure downlink probing channel and feed the channel quality back to CAP, therefore no longer requires uplink probing channel. In which feedback manner, according to capability of STA by the CAP scheduler, and determined in system settings. Configured channel the frame structure may adaptively vary with transmission needs, preferably may also adaptively adjust with time-selective fading radio channel.

APPLICATION EXAMPLE 3

Figure 23:
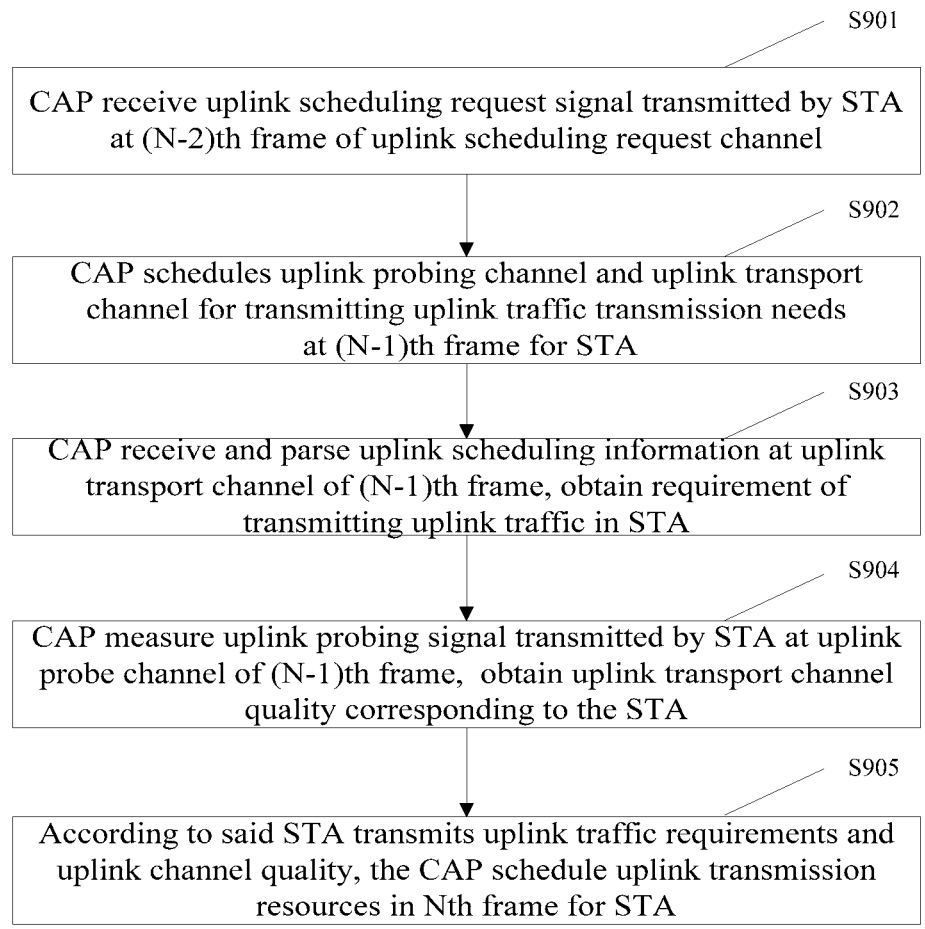
FIG. 23 is a flow chart of uplink scheduling and transmission process in third application examples of the present invention.
Figure 24:
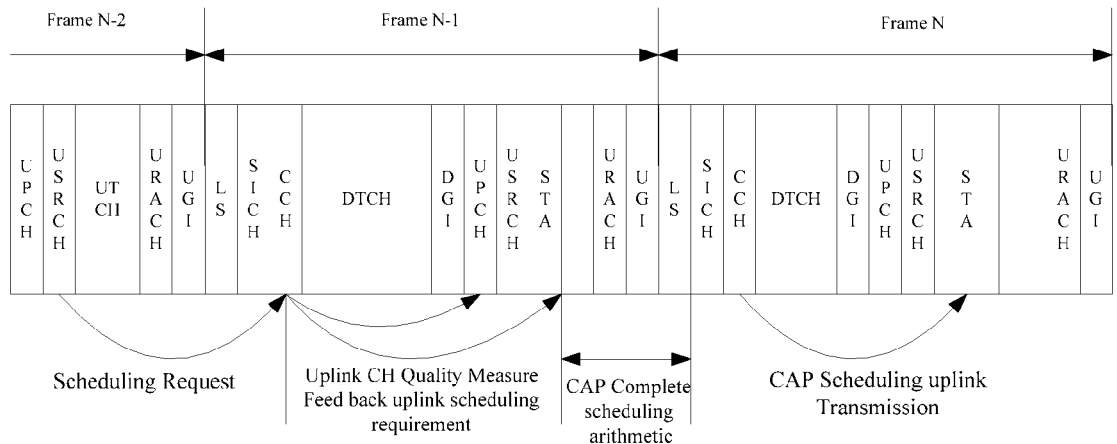

This embodiment provides a uplink scheduling and transmission process, as shown in FIG. 23, specifically includes the steps of:

Step S901: CAP receive uplink scheduling request signal transmitted by STA at (N−2)th frame of uplink scheduling request channel;

Step S902: the CAP schedules the uplink probing channel and uplink transport channel for transmitting uplink traffic transmission needs at (N−1)th frame for STA;

Step S903: the CAP receive and parse uplink scheduling information at uplink transport channel of (N−1)th frame, obtain requirement of transmitting uplink traffic in STA;

The transmit uplink traffic requirements include said STA or the scheduling requirements of different traffic flows of the STA, such as: traffic to be scheduled and queue length, quality of service QoS requirements of different traffic, traffic priority, etc. requirement of transmitting uplink traffic is carried by the uplink scheduling information.

Step S904: the CAP measure uplink probing signal transmitted by the STA at uplink probe channel of (N−1)th frame, obtain uplink transport channel quality corresponding to the STA;

Step S905: According to said STA transmits uplink traffic requirements and uplink channel quality, the CAP schedule uplink transmission resources in Nth frame for STA.

The CAP configure frame structure which match with scheduled transmission resource, STA acquire frame structure by parsing system information channel, acquire specific transmission resource allocation by parsing the control channel.

To illustrate more graphically resource scheduling process in application example of present invention, see FIG. 20, is accomplished by 2 frames of scheduling process of downlink traffic transmission resource, and process of dynamically configuring frame structure according to the scheduled resources.

APPLICATION EXAMPLE 4

Figure 25:
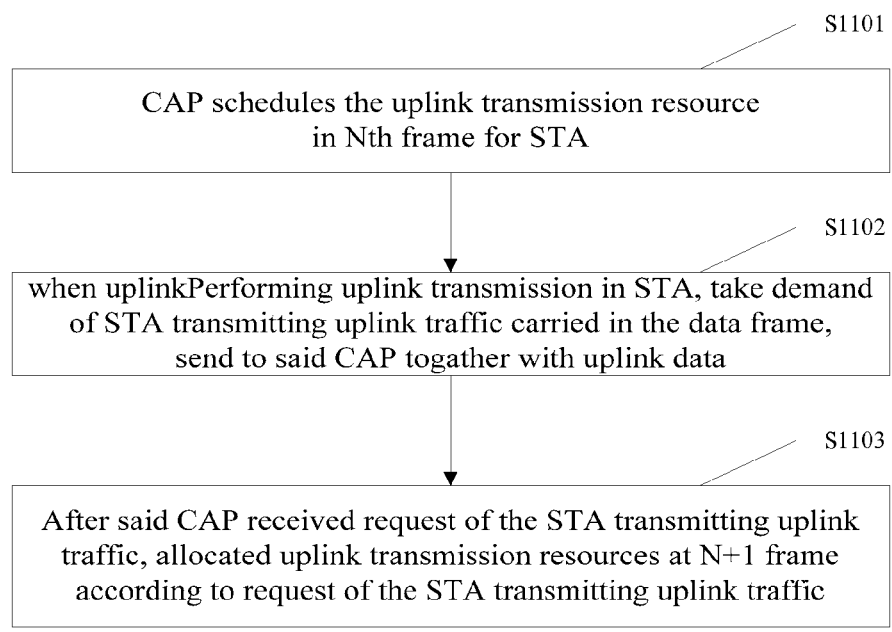

This embodiment provides another uplink scheduling and transmission process, as shown in FIG. 25, specifically includes steps of:

Step S1101: CAP schedules the uplink transmission resource in Nth frame for STA;

Step S1102: when uplink Performing uplink transmission in STA, take demand of STA transmitting uplink traffic carried in the data frame, send to said CAP together with uplink data;

Step S1103: After said CAP received request of the STA transmitting uplink traffic, allocated uplink transmission resources at N+1 frame according to request of the STA transmitting uplink traffic.

Figure 26:
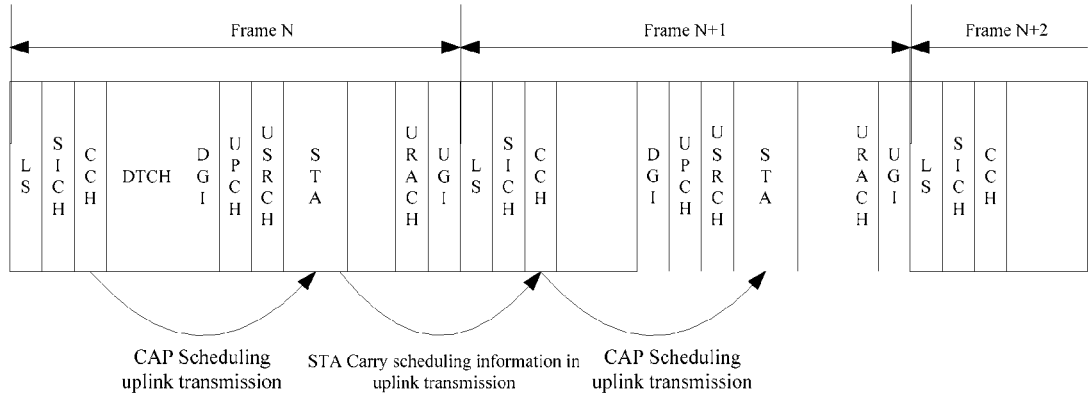
FIG. 26 is schematic of resource scheduling process in 4th application examples of the present invention.

For more graphically illustrating resource scheduling process in application example of present invention, see FIG. 26, accomplish resource scheduling process for uplink traffic transmission by 2 frames, and dynamically configuring frame structure according to the scheduled resources.

APPLICATION EXAMPLE 5

Figure 27:
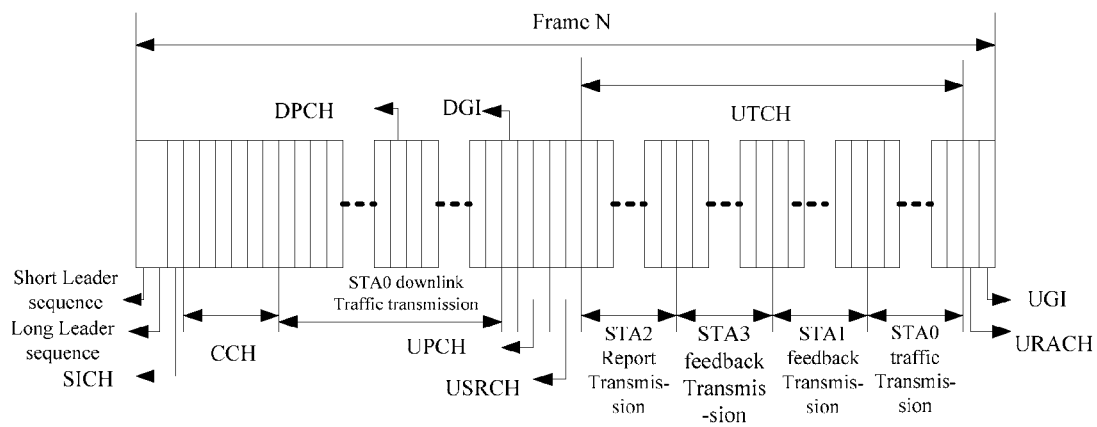
FIG. 27 is a structure schematic of system frame in uplink and downlink scheduling and transmission process in fifth application examples of the present invention.

FIG. 27 is a structure diagram of system frame in uplink and downlink scheduling and transmission process in fifth application examples of present invention;

As shown in FIG. 27, frame is divided into leader sequence, system information channel, control channel, downlink traffic transmission channels, downlink guard interval DGI, uplink probing channel, uplink scheduling request channel, uplink traffic transmission channels, uplink random access channel and uplink guard interval UGI.

Wherein, leader sequence specifically includes short preambles and long preambles.

A CAP associated with 4 STA: STA0, STA1, STA2, and STA3.

In N−1 frame, STA0 perform traffic transmission of uplink and downlink in traffic transmission, but there are still packets queued in the STA0, waiting to be scheduled; during the uplink traffic transmission, STA0 N−1 frame is tinged with upwardly, each traffic uplink queue in STA0 waiting number of packets to be scheduled. To ensure that the (N−1)th frame efficient downlink scheduling, CAP scheduling STA0 at (N−1)th frame feedback of downlink channel quality through uplink transmission channel; to ensure that the (N−1)th frame efficient uplink scheduling, CAP scheduling STA0 in (N−1)th frame by transmitting uplink probing signal in uplink probing channel 1, so as to measure uplink channel quality in CAP. In N−1 frame, there are new downlink traffic arrives STA1, waiting to be scheduled. STA2 finishes the random access procedure in N−1 frame, waiting to be scheduled, reports transmission capability and device configuration of STA2 to the CAP. STA3 successfully initiate uplink scheduling request in uplink scheduling request channel of N−1 frame.

In Nth frame, during downlink transmission, according to downlink transmission queue information of STA0, and downlink channel quality fed back in N−1 frame, CAP schedule 384 OFDM symbols of downlink for downlink traffic transmission for STA0. Since only traffic transmission of STA0, allocate 384 in total OFDM symbols in downlink transport channel of this frame, wherein number 1 to number 384 of OFDM symbols for the CAP to transmits downlink traffic to STA0. To facilitate CAP downlink scheduling STA1 in subsequent frame, CAP initiate downlink probing signal, and schedules STA1 feedback channel state information during uplink transmission. Thus, set 1 OFDM symbols in downlink probing channel of this frame.

During N-th frame, during uplink transmission, CAP according to uplink transmission sequence information fed back from STA0, and CAP according to uplink transmission channel quality measured in uplink probe channel 1, scheduling uplink 128 OFDM symbols for uplink traffic transmission for STA0. CAP allocates 16 OFDM symbols for STA2 for reporting transmission capabilities and device configuration of STA2. CAP assign 16 OFDM symbols for STA3, reporting uplink scheduling channel. Feedback transmission in both STA2 and STA3, using determined modulation and coding format, CAP assign transmission format without reference to quality of uplink transport channel. After transmission, STA0 has no more downlink traffic transmission, therefore STA0 is not required feedback downlink channel quality. However, CAP estimate that STA0 still uplink traffic waiting to be transmitted, thus scheduling STA0 still transmit uplink probing signal in uplink probing channel 1. Meantime, CAP schedule STA3 transmitting uplink signal in uplink probing channel 2, so as to schedule STA3 uplink transmitting in N+1 frame. Additionally, CAP allocate 64 OFDM symbols for STA1 to feedback uplink channel quality.

In summary, the uplink probing channel requiring a total 128+16+16+64=224 OFDM symbols. Where, number 1 to number 16 for STA2 to report device capability; the numbers 17 to number 32 for STA3 to feedback uplink scheduling information; the numbers 33 to number 96 for STA1 to feedback of downlink channel quality; The numbers 98 to number 224 for STA0 to perform uplink transmission. In addition, requires 2 uplink probing channel in this frame. For unknown whether other STA also initiates uplink traffic scheduling request, need to reserve 2 OFDM symbols for uplink scheduling request channel; for unknown if new STA initiate random access, reserve 1 OFDM symbols for uplink random access.

CAP calculate control channel requirements: downlink scheduling transmission, and for (N−1)th frame STA0 uplink transmission feedback ACK/NACK signaling, 2 control channels required in total; need 6 control channels for uplink scheduling transmission, respectively used for STA0, STA1, STA2 and STA3 uplink transmission channel scheduling, and STA0 and STA3 uplink probing channel assigning For above analysis, requires 6 OFDM symbols for control channel transmission.

Based on above scheduling considerations, configure information in Nth frame as follows: 6-th OFDM symbols for control channel transmission, 384 OFDM symbols for downlink traffic transmission, 1 OFDM symbols for downlink probing channel transmission (location of downlink probing channel fixed), 2 OFDM symbols for uplink probing channel transmission, 2 OFDM symbols for uplink scheduling request channel, 224 OFDM symbols for uplink transmission channel, 1 OFDM symbols for uplink random access channel. And one OFDM symbol for each one of inherent short leader sequence, long leader sequence system information channel in system own. The downlink to uplink guard interval DGI, and up to down one OFDM symbol guard interval UGI. The duplicate total: 3+6+384+1+1+2+2+224+1+1=625 OFDM symbols.

Based on above process, after STA0, STA 1, STA 2 and STA 3, received communication frame, by detecting system information channel of broadcast information, available can obtain control channel period 6 OFDM symbols, downlink transmission channel period 384 OFDM symbols, DGI period 1 OFDM symbols, The downlink probing channel period 1 OFDM symbols, uplink probing channel period 2 OFDM symbols, scheduling request channel period 2 OFDM symbols, uplink transmission channel period 224 OFDM symbols, random access channel period 1 OFDM symbols and UGI period 1 OFDM symbols; Embodiments of present invention also provides a indicating method of specific indicating each channel resource allocation in physical frame structure, as follows:

1. System Information Channel and the Control Channel: System Information Channel Field Definition Employs MCS0 for transmission in system information channel, without space-time coding. The system information field definition as shown in Table 1, where period is same as duration described above, such as control channel period refers to duration of control channel previously described.

TABLE 1 system information field defined

| Bit | Definition | Explanatory note |
|---|---|---|
| $b_7 b_6 \ldots b_0$ | The present CAP MAC address lower 8 bits | CAP identification and scrambling seed |
| $b_{20} b_{19} \ldots b_8$ | Reserved | Reserved |
| $b_{23} b_{22} b_{21}$ | CAP antenna configuration | 000, 1 antenna<br>001, 2 antennas<br>. . .<br>111, 8 antennas |
| $b_{29} b_{28} \ldots b_{24}$ | Control channel cycle indication | Control channel cycle, ≤63 OFDM symbols |
| $b_{31} b_{30}$ | Reserved | Reserved |
| $b_{40} b_3 \ldots {}_9 b_{32}$ | Downlink Control channel cycle indication | Downlink Control channel cycle, ≤511 OFDM symbols |
| $b_{47} b_{46} \ldots b_{41}$ | Reserved | Reserved |
| $b_{56} b_{55} \ldots b_{48}$ | Uplink Control channel cycle indication | Uplink Control channel cycle, ≤511 OFDM symbols |
| $b_{63} b_{62} \ldots b_{57}$ | Reserved | Reserved |
| $b_{64}$ | Downlink probe channel configuration | 0, Without downlink probe channel configuration<br>1, configuring downlink probe channel |
| $b_{66} b_{65}$ | Reserved | Reserved |
| $b_{68} b_{67}$ | Uplink probing channel configuration | 00, Without Uplink probing channel configuration<br>01, Uplink probing channel is 1 OFDM symbol<br>10, Uplink probing channel is 2 OFDM symbols<br>11, Uplink probing channel is 4 OFDM symbols |
| $b_{70} b_{69}$ | Uplink scheduling request channel configuration | 00, Without Uplink scheduling request channel<br>01, Scheduling request channel is 1 OFDM symbol<br>10, Scheduling request channel is 2 OFDM symbols<br>01, Scheduling request channel is 4 OFDM symbols |

TABLE 1-continued system information field defined

| Bit | Definition | Explanatory note |
|---|---|---|
| $b_{71}$ | Uplink Random Access Channel | 0, without Uplink Random Access Channel<br>1, Configuring Uplink Random Access Channel |
| $b_{75} b_7 \ldots _4 b_{72}$ | Reserved | Reserved |
| $b_{87} b_{86} \ldots b_{76}$ | Frame label | 0~4095, Frame number count |
| $b_{103} b_{102} \ldots b_{88}$ | 16 bit CRC | CRC Check Protection |
| $b_{111} b_{110} \ldots b_{104}$ | convolutional code encoder return to zero bit | convolutional code end state is returned to Zero |

Wherein, system information channel employs 16 bits CRC check, CRC generator polynomial as $g(D)=D^{16}+D^{12}+D^5+1$.

Initialing state of register is 0xFF, reverse register state and output as CRC check sequence after completion of operation. Higher-order register outputs corresponding higher bits ($b_{103}$), lower-order register outputs corresponding lower bits ($b_{88}$).

2. Control Channel Field Definition:

Using MCS1 transmission in control channel, without space-time coding. The control channel consists of a number of unicast and broadcast scheduling signaling. The uplink and downlink unicast scheduling signaling field as shown in Table 2.

TABLE 2

Downlink and uplink scheduling signaling field defined

| Bit | Definition DL | UL |
|---|---|---|
| $b_0$ | $b_0$ = 1, Downlink scheduling<br>$b_0$ = 0, Uplink scheduling | |
| $b_1$ | $b_1$ = 0, Time Division scheduling of resources<br>$b_1$ = 1, Reserved | |
| $b_5 b_4 \ldots b_2$ | [$b_5 b_4 \ldots b_2$],<br>Bit Map indicates the scheduling signaling effective 20 MHz sub-channel positions | |
| $b_7 b_6$ | Indicating this scheduled transmission modes<br>00: Open Loop SU-MIMO transmission<br>01: Closed loop SU-MIMO transmission(Dedicated demodulation pilot pattern)<br>10: Closed loop SU-MIMO transmission(Valid only when $b_0$ = 1)<br>11: Closed loop SU-MIMO transmission(Public demodulation pilot model) | |
| $b_{16} b_{15} \ldots b_8$ | User resources starting OFDM symbol index, field value: 0~510 | |
| $b_{23} b_{22} \ldots b_{17}$ | Codeword I MCS and parallel spatial stream(≤4) indication | |
| $b_{32} b_3 \ldots _1 b_{24}$ | User resources consecutive OFDM symbol number, field value: 0~511 | |
| $b_{39} b_{38} \ldots b_{33}$ | Codeword II MCS and parallel spatial stream indication<br>1111111, Current transmission is SU-MIMO with Codeword II<br>1111110, Current transmission is 2th Steam MU-MIMO<br>1111101, Current transmission is 3rd Steam MU-MIMO<br>1111100, Current transmission is 4th Steam MU-MIMO<br>1111011, This transmission is 5th Steam MU-MIMO<br>1111010, Current transmission is 6th Steam MU-MIMO<br>1111001, This transmission is 7th Steam MU-MIMO<br>1111000, Current transmission is 8th Steam MU-MIMO<br>0000000~1100011, SU-MIMO codeword II MCS and Number of stream | $b_{36} b_{35} \ldots b_{33}$, BitMap for indicating CQI, CSI, or BFM feedback channel<br>$b_{39} b_{38} b_{37}$,<br>indicating feedback of rows in the matrix for CSI feedback; indicating feedback column number of the matrix for BFM feedback |
| $b_{42} b_{41} b_{40}$ | SU-MIMO: 000<br>MU-MIMO: MU-MIMO: Spatial stream indication index, field value: 0~7 | $b_{40}$ = 1, Requesting CQI feedback<br>$b_{42} b_{41}$ = 01, Requesting CSI feedback<br>$b_{42} b_{41}$ = 10, Requesting BFM feedback<br>$b_{42} b_{41}$ = 11, Reserved |

TABLE 2-continued

Downlink and uplink scheduling signaling field defined

| Bit | Definition DL | UL |
|---|---|---|
| $b_{44}b_{43}$ | 00, BCC Encoding | |
| | 01, LDPC Code length 1 (1344 bits) | |
| | 10, LDPC Code length 2 (2688 bits) | |
| | 11, LDPC Code length 3 (5376 bits) | |
| $b_{45}$ | 0, Time domain demodulation pilot interval 0 (Short Demodulation pilot frequency interval) | |
| | 1, Time domain demodulation pilot interval 0 (Long Demodulation pilot frequency interval) | |
| $b_{47} b_{46}$ | 00, Frequency Domain Demodulation pilot frequency Pattern 1 (DPI = 1) | |
| | 01, Frequency Domain Demodulation pilot frequency Pattern 2 (DPI = 2) | |
| | 10, Frequency Domain Demodulation pilot frequency Pattern 3 (DPI = 4) | |
| | 11, Reserved | |
| $b_{54} b_5 \ldots_3 b_{48}$ | $b_{48} = 0$, $b_{54} \ldots b_{49}$ Indicating for signaling and feedback transmission resource in present user resources group, field value: 0~63 | |
| | $b_{48} = 1$, $b_{54} \ldots b_{49}$ Reserved | |
| $b_{55}$ | 0, Don't use STBC transmission | |
| | 1, Use STBC transmission | |
| $b_{71} b_{70} \ldots b_{56}$ | CRC check protection and STA ID identification | |

Wherein, $b_{71} b_{70} \ldots b_{56}$ is unicast scheduling signaling field distribution of CRC check code with the CAP of this village only 12 bit xor ID.

$[b_{71} \; b_{70} \; \ldots \; b_{56}] = [0000 \; d_{11} \; d_{10} \; \ldots \; d_0]_{STAID} \oplus [c_{15} \; c_{14} \; \ldots \; c_0]_{CRC}$ Control channel use 16-bit CRC check, polynomial generated by CRC is $g(D)=D^{16}+D^{12}+D^5+1$. Definition is same as Table 1.

3. Uplink and Downlink Transmission Channel:

Allocation Type of Resource of Uplink and Downlink Transmission Channel

This section supports a time division resource multiplexing scheduling in uplink and downlink transmission channel.

Time Division Resource Allocation:

Time-frequency resource assigned for each STA in the uplink or downlink transmission channel called as the resource group.

When Time division multiplexing used, OFDM symbol index in STA resource group according to time growth direction is from 0 to D ($b_{32} b_{31} \ldots b_{24}$)-1. Wherein, D($b_{32} b_{31} \ldots b_{24}$) representing decimal number corresponding to $b_{32} b_{31} \ldots b_{24}$.

Resource Indication for Uplink and Downlink Transmission Channel

Time Division Resource Allocation:

In the scheduling signaling (listed in Table 2), Use $[b_{16} b_{15} \ldots b_g]$ to indicate user resources group starting OFDM symbol index, field value: 0~510; Use $[b_{32} b_{31} \ldots b_{24}]$ to indicate consecutive OFDM symbol number occupied by STA resource group, field value: 0~511.

Resources Group Allocated for STA Including Resources Occupied by Demodulation Pilot.

Demodulation Pilot Frequency of Transmission Channel

Demodulating pilot pattern may be adjusted dynamically in present section. enabling different time domain pilot interval to be configured by control channel scheduling signaling b45 (listed in Table 2); enabling different Frequency Domain pilot frequency Pattern to be configured by control channel scheduling signaling b47 b46 (listed in Table 2);

If $b_7 b_6$ listed in Table 2 is 01 or 10, Demodulation pilot needs pre-coding processing (special demodulation pilot); If $b_7 b_6$ listed in Table 2 is 00 or 11, Demodulation pilot does not need pre-coding processing (public demodulation pilot);

Demodulating pilot pattern as shown in table 3.

TABLE 3

Demodulating pilot pattern

| Index | $N_{sts}$ | $DPI_F$ | $DP_{num}$ |
|---|---|---|---|
| 1 | 1 | 1 | 1 |
| 2 | 1 | 2 | 1 |
| 3 | 2 | 1 | 2 |
| 4 | 2 | 2 | 1 |
| 5 | 3 | 1 | 3 |
| 6 | 3 | 2 | 2 |
| 7 | 3 | 4 | 1 |
| 8 | 4 | 1 | 4 |
| 9 | 4 | 2 | 2 |
| 10 | 4 | 4 | 1 |
| 11 | 5 | 1 | 5 |
| 12 | 5 | 2 | 3 |
| 13 | 5 | 4 | 2 |
| 14 | 6 | 1 | 6 |
| 15 | 6 | 2 | 3 |
| 16 | 6 | 4 | 2 |
| 17 | 7 | 1 | 7 |
| 18 | 7 | 2 | 4 |
| 19 | 7 | 4 | 2 |
| 20 | 8 | 1 | 8 |
| 21 | 8 | 2 | 4 |
| 22 | 8 | 4 | 2 |

Wherein, (1) Pilot interval DPIF refers to same spatial-time flow pilot symbol subcarrier cycle. For example: DPIF=2 indicates every 2 adjacent useful subcarriers with one demodulated pilot.

(2) Pilot symbols Number DPIF refers to number of consecutive OFDM symbol occupied by demodulation pilot in time domain.

Sub-carrier position corresponding to each pilot symbol defined in demodulation pilot frequency pattern as shown in table 4.

TABLE 4

Demodulation pilot position

| Carrier Aggregation Mode | Bandwidth | Demodulation Pilot Sub-carrier assemblage |
|---|---|---|
| 1 | 20 MHz | $SC_{dp}^{sti} = [\pm(1+sti-(l-1)\cdot DPI), \pm(1+DPI+sti-(l-1)\cdot DPI), \ldots, \pm(N+sti-(l-1)\cdot DPI)]_{l=\lfloor \frac{sti}{DPI} \rfloor+1}$<br>$N = 1 + DPI \cdot \lfloor (N_{sr} - sti + (l-1)\cdot DPI - 1)/DPI \rfloor$<br>$DPI = 1, 2, 4, 8$<br>$sti = 0\sim 7$<br>$N_{sr} = 115$ |
| | 40 MHz | $SC_{dp}^{sti} = \begin{cases} 128 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor \frac{sti}{DPI} \rfloor+1} \\ -128 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor \frac{sti}{DPI} \rfloor+1} \end{cases}$<br>$N = 1 + DPI \cdot \lfloor (N_{sr} - sti + (l-1)\cdot DPI - 1)/DPI \rfloor$<br>$DPI = 1, 2, 4, 8$<br>$sti = 0\sim 7$<br>$N_{sr} = 115$ |
| | 80 MHz | $SC_{dp}^{sti} = \begin{cases} 384 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor \frac{sti}{DPI} \rfloor+1} \\ 128 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor \frac{sti}{DPI} \rfloor+1} \\ -128 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor \frac{sti}{DPI} \rfloor+1} \\ -384 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor \frac{sti}{DPI} \rfloor+1} \end{cases}$<br>$N = 1 + DPI \cdot \lfloor (N_{sr} - sti + (l-1)\cdot DPI - 1)/DPI \rfloor$<br>$DPI = 1, 2, 4, 8$<br>$sti = 0\sim 7$<br>$N_{sr} = 115$ |
| 2 | 40 MHz | $SC_{dp}^{sti} = [\pm(1+sti-(l-1)\cdot DPI)), \pm(1+DPI+sti-(l-1)\cdot DPI)), \ldots, \pm(N+sti-(l-1)\cdot DPI))]_{l=\lfloor \frac{sti}{DPI} \rfloor+1}$<br>$N = 1 + DPI \cdot \lfloor (N_{sr} - sti + (l-1)\cdot DPI - 1)/DPI \rfloor$<br>$DPI = 1, 2, 4, 8$<br>$sti = 0\sim 7$<br>$N_{sr} = 243$ |
| | 80 MHz | $SC_{dp}^{sti} = [\pm(1+sti-(l-1)\cdot DPI)), \pm(1+DPI+sti-(l-1)\cdot DPI)), \ldots, \pm(N+sti-(l-1)\cdot DPI))]_{l=\lfloor \frac{sti}{DPI} \rfloor+1}$<br>$N = 1 + DPI \cdot \lfloor (N_{sr} - sti + (l-1)\cdot DPI - 1)/DPI \rfloor$<br>$DPI = 1, 2, 4, 8$<br>$sti = 0\sim 7$<br>$N_{sr} = 499$ |

Wherein, $SC_{dp}^{sti}$ is sti th demodulation pilot space-time stream pilot sub-carrier index set. $l=1, \ldots, DP_{num}$ refer to OFDM symbols occupied by demodulating pilots; DPI in table is demodulating pilot interval in frequency domain, that is $DPI_F$.

The demodulating pilot interval is designed as follows:

By controlling channel scheduling signaling $b_{45}$ (Table 2) can configure different time domain pilot interval, adaptively varying radio propagation environments. The time domain pilot interval configuration, $DPI_T$, that is:

Every $DPI_T$ OFDM symbol inserted into a set of demodulated pilots. $b_{45}=0$ is short $DPI_T$, $b_{45}=1$ is long $DPI_T$ long and short $DPI_T$ indicated in BCF frame MAC layer.

The Demodulating Pilot Sequence

The pilot sequence generator polynomial is $1+X^{11}+X^{15}$, generated sequence through BPSK modulating to obtain pilot symbol sequence $\{s_i\}$ $i=0, 1, \ldots, 32767$.

Initialing state of register is:

[0 0 1 0 1 0 1 1 $a_6$ $a_5$ $a_4$ $a_3$ $a_2$ $a_1$ $a_0$]

MSB in the left, LSB on the right. $a_6$ $a_5$ . . . $a_0$ is MAC address lowest 7 bits of CAP.

The demodulating pilot mapped to time-frequency resource as following rules. command:

$$i = 231 \cdot l + (k + 115)$$
Wherein: $k = -115, \ldots, +115; l = 0, 1, \ldots, DP_{num} - 1$.
$i = 0$
for $l = 0:1:DP_{num} -1$
  for $k = -115:1:+115$
    if $k \in SC_{dp}^{sti}$
      $p_{k,l}^{sti} = s_i$
    else
      $p_{k,l}^{sti} = 0$ -continued

```
        end
    i = i + 1
        end
    end
```

The Downlink Transmission Channel Multi-antenna Scheme:

Under multi-antenna transmission mode, port of time-domain baseband signal of ti th antenna is:

$$r_{Field}^{(ti)}(t) = \frac{1}{\sqrt{N_{Field}^{Tone} \cdot N_{sts}}} w_T(t) \sum_{\substack{k=-N_{fft}/2 \\ k \notin SC_V}}^{N_{fft}/2-1} \sum_{si=1}^{N_{sts}} [Q_k]_{ti,si} \tilde{x}_k^{(si)} \exp(j2\pi k \Delta \mathrm{ft})$$

wherein, $w_T(t)$ is time domain window function, $\tilde{x}_k^{(si)}$ is loaded symbol of kth subcarrier on si-th spatial stream, $[Q_k]_{ti,si}$ indicate pre-coding matrix, The row ti-th, column si-th element of $Q_k \in C^{N_{TX} \times N_{ss}}$.

Downlink Multi-antenna Transmission Mode Supported in this Section:
  Mode 1: open loop SU-MIMO
  Mode 2: closed loop SU-MIMO
  Mode 3: closed loop MU-MIMO
  wherein:
  Mode 1: open loop SU-MIMO The open loop SU-MIMO, STA may receive two codewords in parallel. The pre-coding matrix $Q_k \in C^{N_{Tx} \times N_{sts}}$ under open-loop mode is column orthogonal matrix, and $\|Q_k\| = \sqrt{N_{sts}}$.

Mode 2: closed loop SU-MIMO

The closed loop SU-MIMO, STA may receive two code words in parallel, and in units of subcarrier pre-coding. Pre-coding matrix groups are defined as follows: pre-coding packet number of useful subcarriers is $N_g$, the g-th subcarrier in the packet sequence number set is $\Omega_g$, the set use the same pre-coding matrix.

$|\Omega_g|$ number of sub-carriers under SU-MIMO mode within the same pre-coding packets defined by following formulate:

$$|\Omega_g| = 4 \cdot DPI_F$$

Wherein $DPI_F$ defined in Appendix B. when using pre-coding packets, values of $DPI_F$ is both 1 and 2.

When $DPI_F=1$, 4 sub-carriers group:
[−115,−113][−112,−109][−108,−105][−104,−101]
  [−100,−97][−96,−93][−92,−89][−88,−85][−84,−81]
  [−80,−77][−76,−73][−72,−69][−68,−65][−64,−61]
  [−60,−57][−56,−53][−52,−49][−48,−45][−44,−41]
  [−40,−37][−36,−33][−32,−29][−28,−25][−24,−21]
  [−20,−17][−16,−13][−12,−9][−8,−5][−4,−1][1,4][5,8]
  [9,12][13,16][17,20][21, 24][25,28][29,32][33,36][37,
  40][41,44][45,48][49,52][53,56][57,60][61,64][65,68]
  [69,72][73,76][77,80][81,84][85,88][89,92][93,96][97,
  100][101,104][105,108][109,112][113,115]

When $DPI_F=2$, 4 sub-carriers group:
[−115,−105][−104,−97][−96,−89][−88,−81][−80,−73]
[−72,−65][−64,−57][−56,−49][−48,−41][−40,−33][−32,
−25][−24,−17][−16,−9][−8,−1][1,8][9,16][17,24][25,32]
[33,40][41,48][49,56][57,64][65,72][73,80][81,88][89,96]
[97,104][105,115]

Under the closed loop SU-MIMO, STA may indicate feedback channel information according to MAC layer.

Mode 3: Closed Loop MU-MIMO

When closed loop MU-MIMO, each STA can only receives one codeword, and pre-coding in units of subcarrier set. Pre-coding matrix groups are defined as follows: number of pre-coding packets useful subcarriers sets is $N_g$, serial number of subcarrier set in g-th packet is $\Omega_g$, use same pre-coding matrix in the set, $|\Omega_g|$ number of subcarriers of same pre-coding packets under MU-MIMO mode determined by following formula.

$$|\Omega_g| = DPI_F$$

wherein, $DPI_F$ is defined as Table 2, using MU-MIMO pre-coding packets based on feedback of CSI matrix, value of $DPI_F$ is 1.

Under closed loop MU-MIMO, STA may indicate feedback channel information according to MAC layer.

The Uplink Transmission Channel Multiple Antenna Scheme

Downlink multi-antenna transmission mode supported in this section:
  Mode 1: open loop SU-MIMO
  Mode 2: closed loop SU-MIMO
  4, signaling/feedback Said transmission channel here refer to channel for transmitting signaling/feedback information.

SAT multiplexing resources BY time division, $b_{54}$ $b_{53}$ ... $b_{49}$ in Table 2 indicates traffic transmission from OFDM symbols with index $D(b_{54} b_{53} ... b_{49})$ in STA resource group, begins transmitting packet data and demodulating pilot.

$D(b_{54} b_{53} ... b_{49})$ is decimal number corresponding to $b_{54}$ $b_{53}$ ... $b_{49}$, wherein $b_{54}$ is higher bit, $b_{49}$ is low bit. In the STA resource group, OFDM symbols 0 to OFDM symbol $D(b_{54} b_{53} ... b_{49})-1$ used for signaling or feedback transmission, and transmission format independent of indicated in Table 2. The corresponding transport format shown in Table 5.

TABLE 5

| signaling/feedback transmission format | |
|---|---|
| Coding | Convolutional code, 1/2 rate |
| Number of stream | Uniflow |
| Modulation | QPSK |
| Space-time encoding | Disabled |
| Common demodulation pilot | Format 1 (table 2 and 4) |
| Transmission mode | Open loop SU-MIMO |

In addition to allocated traffic transmission resources table 2 for signaling/feedback transmission, may also assign dedicated signaling/feedback transmission resources by broadcast signaling.

Figure 28:
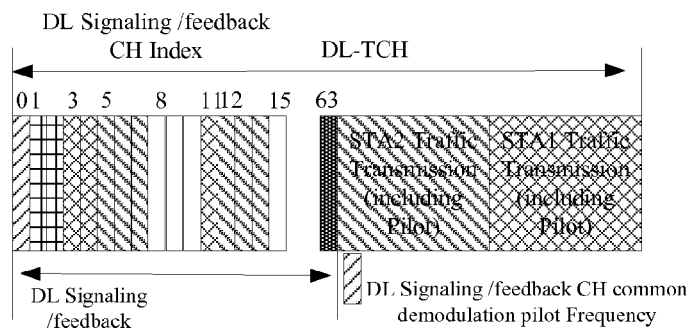
FIG. 28 is a schematic of a downlink signaling/feedback transmission channel multiplexed DL-TCH resources.

Downlink Signaling/Feedback Transmission Channel:

Downlink signaling/feedback transmission channel multiplexing DL-TCH resources, shown in FIG. 28. All downlink signaling/feedback transmission channel share a demodulation pilot.

Figure 29:
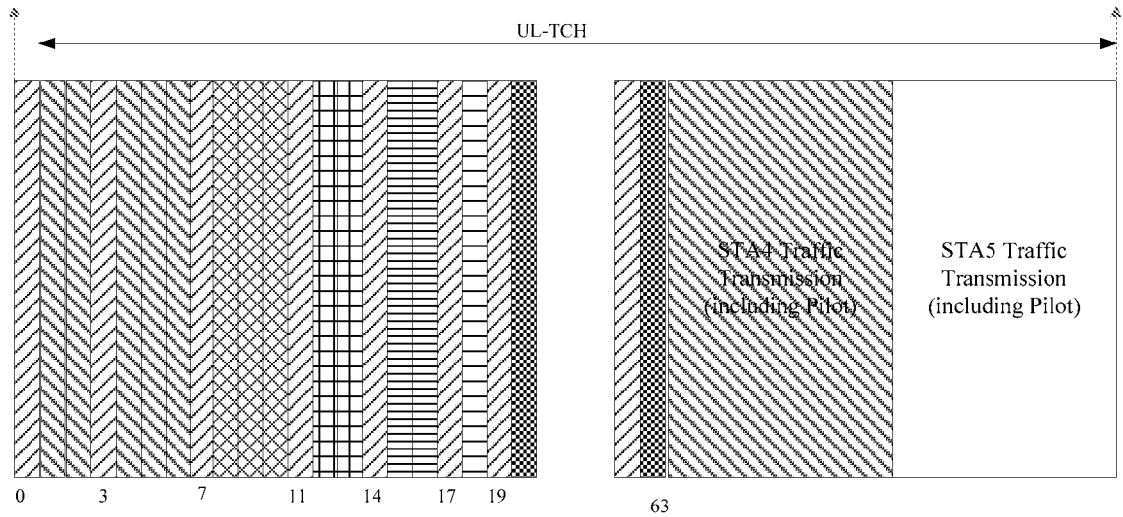
FIG. 29 is a schematic of the first uplink signaling/feedback channel.
Figure 30:
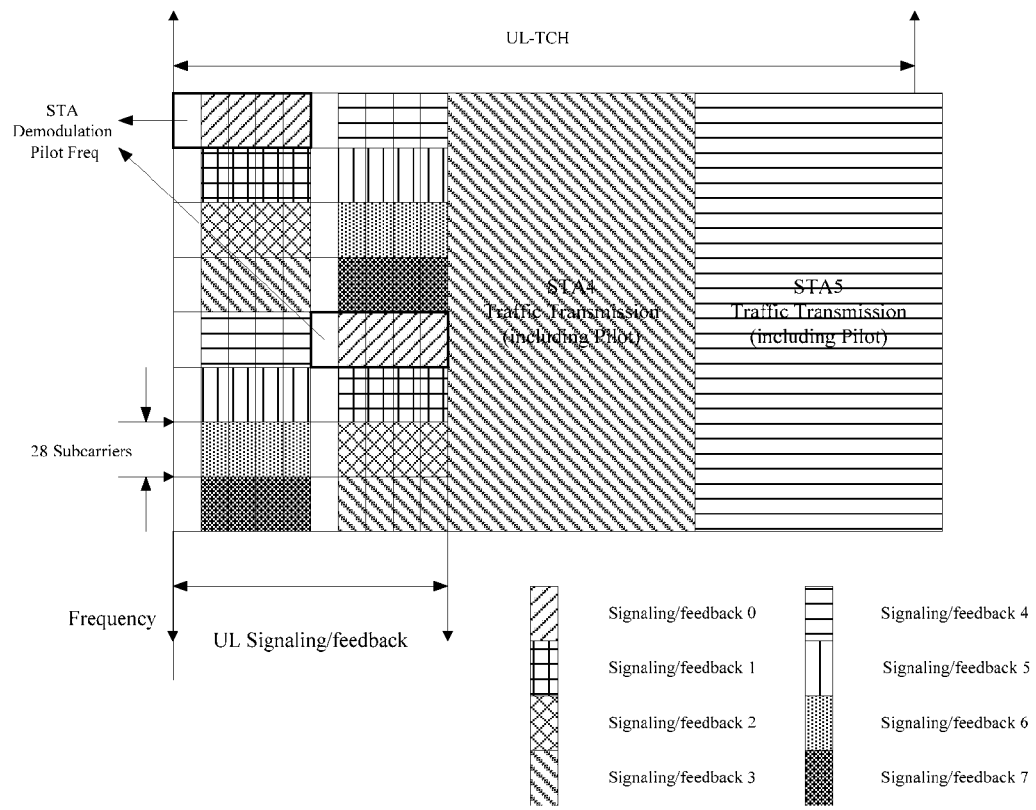
FIG. 30 is a schematic of the second uplink signaling/feedback channel.

Uplink Signaling/Feedback Transmission Channel:

The uplink signaling/feedback transmission channel multiplexed UL-TCH resources. The uplink signaling/feedback transmission channel can support two structures, respectively as shown in FIGS. 29 and 30. In format 2 showed as FIG. 30, each basic resource block is $28_{subc} \times 8_{symbol}$ (does not include a phase tracking pilot). Wherein, front 4 OFDM symbols and latter 4 OFDM symbols hopping by mode as shown.

The Signaling/Feedback Transmission Channel Resource Indication:

Each frame, signaling/feedback transmission channel occupying resource in DL-TCH and UL-TCH by CCH broadcast scheduling signaling informs all STA in broadcast manner. The broadcast scheduling signaling uses control channel resources, have same packet size as control channel scheduling signaling, using the same transmission format (See Table 2). Broadcast scheduling signaling CRC check scrambling with BSTAID defined in MAC layer. Field defined as in Table 6.

TABLE 6

The signaling/feedback transmission channel resource indication signaling field definition

| | Definition | |
|---|---|---|
| Bit | DL | UL |
| $b_3 b_2 b_1 b_0$ | Broadcast Cast $b_3 b_2 b_1 b_0 = 0000$, Downlink signaling/feedback transmission channel resource indication $b_3 b_2 b_1 b_0 = 0001$, Uplink signaling/feedback transmission channel resource indication | |
| $b_7 b_6 b_5 b_4$ | 20 MHz Sub-channel Bitmap, The plurality of sub-channels may be provided the same signaling/feedback channel | |
| $b_{16} b_{15} \ldots b_8$ | The signaling/feedback channel resources start OFDM symbol index, threshold: 0~510 | |
| $b_{22} b_{21} \ldots b_{17}$ | Reserved | |
| $b_{28} b_{27} \ldots b_{23}$ | The signaling/feedback channel occupancy number of symbols, threshold: 1~63 | |
| $b_{30} b_{29}$ | Reserved | 00: Format 1 01: Format 2 10~11: Reserved |
| $b_{31}$ | 0: Downlink broadcast channel assignment effective 1: Downlink broadcast channel assign an invalid | Reserved |
| $b_{36} b_{35} \ldots b_{32}$ | Signaling/feedback channel start index occupied by downlink broadcast channel, domain values: 1~31 | |
| $b_{39} b_{38} b_{37}$ | Number of Signaling/feedback channel occupied by downlink broadcast channel, domain values: 1~7 | |
| $b_{55} b_{54} \ldots b_{40}$ | Reserved | |
| $b_{71} b_{70} \ldots b_{56}$ | 16 Bit CRC is scrambled by BSTAID | |

Wherein, downlink signaling feedback channel occupancy of OFDM symbol number is $D(b_{28} b_{27} \ldots b_{23})$, OFDM symbol with index 0 is a common demodulation pilot occupies resources. CRC defined same as in table 1.

Signaling/Feedback Transmission Channel Assignment:

CAP may be by signaling as shown in table 7 as STA allocation signaling/feedback transmission channel.

TABLE 7 signaling/feedback transmission channel assignment signaling field definition

| | Definition | |
|---|---|---|
| Bit | DL | UL |
| $b_3 b_2 b_1 b_0$ | Broadcast Type $b_3 b_2 b_1 b_0 = 0010$, Downlink signaling/feedback channel allocation $b_3 b_2 b_1 b_0 = 0011$, Uplink signaling/feedback channel allocation | |
| $b_7 b_6 b_5 b_4$ | Reserved | |
| $b_{31} b_{30} \ldots b_8$ Channel 1 | $b_{19} b_{18} \ldots b_8$, Indicating STA ID $b_{22} b_{21} b_{20}$, Reserved $b_{28} b_{27} \ldots b_{23}$, Indicates that the STA in signaling/feedback channel starting position index, the threshold value ranges 0~63. $b_{31} b_{30} b_{29}$, Indicating occupancy of signaling/feedback channel number, domain values: 1~7; Domain value of 0 indicates the channel indication is invalid. | |
| $b_{55} b_5 \ldots_4 b_{32}$ | $b_{43} b_{42} \ldots b_{32}$, Indicating STA ID | |

TABLE 7-continued signaling/feedback transmission channel assignment signaling field definition

| | Definition | |
|---|---|---|
| Bit | DL | UL |
| Channel 2 | $b_{46}$ $b_{45}$ $b_{44}$, Reserved $b_{52}$ $b_{51}$ ... $b_{47}$, Indicates that the STA in signaling/feedback channel starting position index, the threshold value ranges 0~63. $b_{55}b_{54}b_{53}$, Indicating occupancy of signaling/feedback channel number, domain values: 1~7; Domain value of 0 indicates the channel indication is invalid. | |
| $b_{71}$ $b_{70}$ ... $b_{56}$ | 16 Bit CRC is scrambled by BSTAID | |

Wherein:

Downlink signaling feedback transmission channel, $D(b_{28}\ b_{27}\ ...\ b_{23})$ Corresponding STA downlink signaling feedback indicated are the 1-th OFDM symbol of the transmission channel, $D(b_{28}\ b_{27}\ ...\ b_{23})=0$ Indicates a downlink signaling feedback transmission channel common demodulation pilot, belongs to an invalid indication.

Uplink signaling feedback transmission channel format 1, $D(b_{28}\ b_{27}\ ...\ b_{23})$ Corresponding STA uplink signaling feedback indicated are the 1-th OFDM symbol of the transmission channel, $D(b_{28}\ b_{27}\ ...\ b_{23})-1$ Corresponding OFDM symbols is the STA uplink signaling feedback transmission channel demodulating the pilot. For format 1, $D(b_{28}\ b_{27}\ ...\ b_{23})=0$ is an invalid indication.

Uplink signaling feedback transmission channel format 2, $D(b_{28}\ b_{27}\ ...\ b_{23})$ Indicated are corresponding STA uplink signaling feedback transmission channel index, $D(b_{28}\ b_{27}\ ...\ b_{23})=0$ indicate a signaling/feedback channel 0.

Downlink signaling feedback transmission channel and the uplink signaling feedback transmission channel format 1, each OFDM symbol is a signaling/feedback channel; Uplink signaling feedback transmission channel format 2, each resource block is a signaling/feedback channel.

5. Uplink and Downlink Probing Channel

Downlink Probing Channel:

Downlink Probing Pilot Pattern:

Downlink probing channel may support logical antenna port numbers vary 1~8, pilot pattern as follows:

TABLE 8 probing pilot pattern

| Index | $N_{tx}$ | SPI | $SP_{num}$ |
|---|---|---|---|
| 1 | 1 | 4 | 1 |
| 2 | 2 | 4 | 1 |
| 3 | 3 | 4 | 1 |
| 4 | 4 | 4 | 1 |
| 5 | 5 | 4 | 2 |
| 6 | 6 | 4 | 2 |
| 7 | 7 | 4 | 2 |
| 8 | 8 | 4 | 2 |

Adjustable frequency table 9 defined apparent pattern corresponding to each pilot symbol in sub-carrier positions

TABLE 9 probing pilot position

| Carrier Aggregation Mode | Band width | Detection pilot subcarrier set |
|---|---|---|
| 1 | 20 MHz | $SC_{sp}^{ti} = [\pm(1+ti-(l-1)\cdot SPI), \pm(1+SPI+ti-(l-1)\cdot SPI), \ldots, \pm(N+ti-(l-1)\cdot SPI)]_{l=\lfloor \frac{ti}{SPI} \rfloor +1}$ <br> $N = 1 + SPI \cdot \lfloor (N_{sr} - ti + (l-1)\cdot SPI - 1)/SPI \rfloor$ <br> $SPI = 4$ <br> $ti = 0\sim 7$ <br> $N_{sr} = 115$ |
| | 40 MHz | $SC_{sp}^{ti} = \begin{cases} 128 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor \frac{ti}{SPI} \rfloor +1} \\ -128 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor \frac{ti}{SPI} \rfloor +1} \end{cases}$ <br> $N = 1 + SPI \cdot \lfloor (N_{sr} - ti + (l-1)\cdot SPI - 1)/SPI \rfloor$ <br> $SPI = 4$ <br> $ti = 0\sim 7$ <br> $N_{sr} = 115$ |

TABLE 9-continued probing pilot position

| Carrier Aggregation Mode | Band width | Detection pilot subcarrier set |
|---|---|---|
| 1 | 20 MHz | $SC_{sp}^{ti} = [\pm(1+ti-(l-1)\cdot SPI), \pm(1+SPI+ti-(l-1)\cdot SPI), \ldots, \pm(N+ti-(l-1)\cdot SPI)]_{l=\lfloor\frac{ti}{SPI}\rfloor+1}$ <br> $N = 1 + SPI \cdot \lfloor(N_{sr} - ti + (l-1)\cdot SPI - 1)/SPI\rfloor$ <br> $SPI = 4$ <br> $ti = 0\sim7$ <br> $N_{sr} = 115$ |
| | 80 MHz | $SC_{Sp}^{ti} = \begin{cases} 384 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor\frac{ti}{SPI}\rfloor+1} \\ 128 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor\frac{ti}{SPI}\rfloor+1} \\ -128 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor\frac{ti}{SPI}\rfloor+1} \\ -384 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor\frac{ti}{SPI}\rfloor+1} \end{cases}$ <br> $N = 1 + SPI \cdot \lfloor(N_{sr} - ti + (l-1)\cdot SPI - 1)/SPI\rfloor$ <br> $SPI = 4$ <br> $ti = 0\sim7$ <br> $N_{sr} = 115$ |
| 2 | 40 MHz | $SC_{sp}^{ti} = [\pm(1+ti-(l-1)\cdot SPI)), \pm(1+SPI+ti-(l-1)\cdot SPI)), \ldots, \pm(N+ti-(l-1)\cdot SPI))]_{l=\lfloor\frac{ti}{SPI}\rfloor+1}$ <br> $N = 1 + SPI \cdot \lfloor(N_{sr} - ti + (l-1)\cdot SPI - 1)/SPI\rfloor$ <br> $SPI = 4$ <br> $ti = 0\sim7$ <br> $N_{sr} = 243$ |
| | 80 MHz | $SC_{sp}^{ti} = [\pm(1+ti-(l-1)\cdot SPI)), \pm(1+SPI+ti-(l-1)\cdot SPI)), \ldots, \pm(N+ti-(l-1)\cdot SPI))]_{l=\lfloor\frac{ti}{SPI}\rfloor+1}$ <br> $N = 1 + SPI \cdot \lfloor(N_{sr} - ti + (l-1)\cdot SPI - 1)/SPI\rfloor$ <br> $SPI = 4$ <br> $ti = 0\sim7$ <br> $N_{sr} = 499$ |

Wherein, $SC_{sp}^{ti}$ is the $No^{ti}$ antenna port probing pilot sub-carrier index set; $l=0, 1, \ldots, SP_{num}-1$ OFDM symbols indicating the detection pilot occupies.

Downlink Detection Sequence Generation:

Pilot sequence generator polynomial is $1+X^{11}+X^{15}$. Generate BPSK modulated pilot symbol sequence $\{s_i\}$ $i=0, 1, \ldots, 32767$, Initialing state of register is:

[0 0 1 0 1 0 1 1 $a_6$ $a_5$ $a_4$ $a_3$ $a_2$ $a_1$ $a_0$]

MSB on left, LSB on right. $a_6$ $a_5$ ... $a_0$ is least 7 bits of MAC address of CAP. Probing pilot map to time-frequency resources according to following rules. Let:

$i = 231 \cdot l + (k + 115)$

Wherein: $k = -115, \ldots, +115; l = 0, 1, \ldots, SP_{num}-1$.

```
i = 0
for l = 0:1:SP_num - 1
```

-continued

```
    for k = -115:1:+115
        if k ∈ SC_sp^ti
            p_{k,l}^ti = s_i
        else
            p_{k,l}^ti = 0
        end
        i = i + 1
    end
end
```

Uplink Probing Channel

Uplink Probing Pilot Ports

TABLE 10 uplink probing pilot index

| | | Uplink probing pilot port index | | | |
|---|---|---|---|---|---|
| Sub-carrier packet index | Pilot ports carrier position | OFDM symbol0 | OFDM symbol1 | OFDM symbol2 | OFDM symbol3 |
| 0 | [±1, ±5 . . . , ±113] | 0 | 4 | 8 | 12 |
| 1 | [±2, ±6, . . . , ±114] | 1 | 5 | 9 | 13 |

TABLE 10-continued uplink probing pilot index

| Sub-carrier packet index | Pilot ports carrier position | Uplink probing pilot port index | | | |
|---|---|---|---|---|---|
| | | OFDM symbol0 | OFDM symbol1 | OFDM symbol2 | OFDM symbol3 |
| 2 | [±3, ±7, . . . , ±115] | 2 | 6 | 10 | 14 |
| 3 | [±4, ±8, . . . , ±112] | 3 | 7 | 11 | 15 |

Uplink Probing Channel Allocation

CAP assign uplink probing channel for STA by signaling shown in table 11.

TABLE 11 uplink probing channel assignment signaling field definition

| Bit | Definition |
|---|---|
| $b_3b_2b_1b_0$ | Broadcast type<br>$b_3b_2b_1b_0$ = 0111, Uplink probing channel resource indication |
| $b_7b_6b_5b_4$ | Reserved |
| $b_{23}b_{22} \ldots b_8$ | Port 1  $b_{19}b_{18} \ldots b_8$, STA ID<br>$b_{23}b_{22} \ldots b_{20}$, Uplink probing pilot port index |
| $b_{39}b_{38} \ldots b_{24}$ | Port 2  $b_{35}b_{34} \ldots b_{24}$, STA ID<br>$b_{39}b_{38} \ldots b_{36}$, Uplink probing pilot port index |
| $b_{55}b_{54} \ldots b_{40}$ | Port 3  $b_{51}b_{50} \ldots b_{40}$, STA ID<br>$b_{55}b_{54} \ldots b_{52}$, Uplink probing pilot port index |
| $b_{71} b_{70} \ldots b_{56}$ | 16 Bit CRC is scrambled by BSTAID |

Wherein, Uplink probing pilot port index indicate probing pilot port of STA antenna 0. If multi-antenna configuration in STA, other antenna uplink probing pilot port index as following formula:

$$SP_{ti}^{UL} = D(b_k b_{k-1} \ldots b_{k-3}) + ti \ (ti=0, 1, \ldots, 7)$$

Wherein, $D(b_k b_{k-1} \ldots b_{k-3})$ Represents decimal number Corresponding to bits $b_k b_{k-1} \ldots b_{k-3}$.

Uplink Probing Pilot Sequence:

Pilot sequence generator polynomial is $1+X^{11}+X^{15}$. Generate BPSK modulated pilot symbol $\{s_i\}$ i=0, 1, . . . , 32767. Register initial state is:

[0 0 1 0 1 0 1 1 $a_6$ $a_5$ $a_4$ $a_3$ $a_2$ $a_1$ $a_0$]

MSB on left, LSB on right. $a_6$ $a_5$ . . . $a_0$ is least 7 bits of MAC address of CAP. uplink probing pilot port set which CAP allocated for STA is $SP_{port}^{ti}=\{(k,l)k\in[-115,+115], l\in[0, 3]\}$, ti is STA antenna port index, port is uplink probing pilot port index. Uplink probing pilot mapped to time-frequency resources according to the following rules. Let

```
i = 231·l + (k + 115)
  Wherein: k = −115,...,+115 , l = 0,1,2,3
    i = 0
    for l = 0:1:3
      for k = −115:1:+115
        if {k,l} ∈ {SP_port^ti|ti = 0,1,...,N_tx −1}
          p_port^{k,l} = s_i
        else
          p_port^{k,l} = 0
        end
        i = i + 1
      end
    end
```

6. Uplink Scheduling Request Channel

Figure 31:
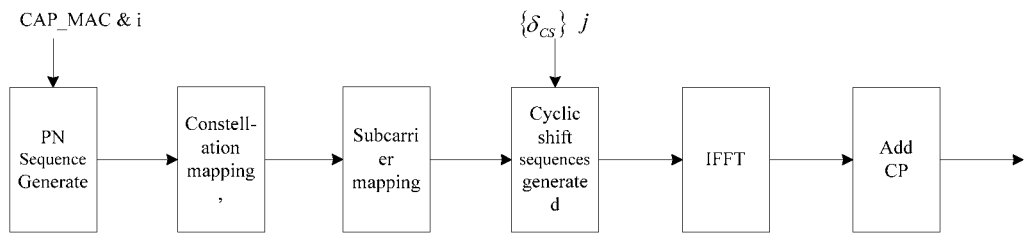
FIG. 31 is a schematic of a generation process of the uplink scheduling request channel.

Uplink scheduling request signal generated according to method shown in FIG. 31

In fig. CAP_MAC refers to the CAP least 7 bits of the MAC address, i is PN sequence index (0≤i<4), $\{\delta_{CS}\}$ is cyclic shift parameter set, j is cyclic shift parameter index 0≤j<8.

PN Sequence Generated

Figure 32:
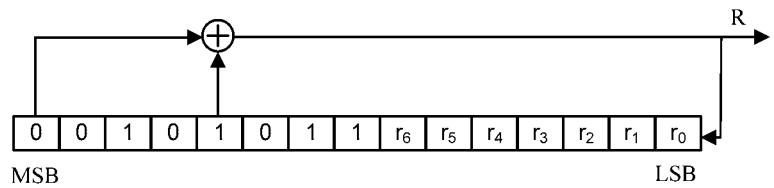
FIG. 32 shows a maximal length linear feedback shift register sequence of a PN sequence.

PN sequence with generator polynomial is $1+X^{11}+X^{15}$ of a maximal length linear feedback shift register sequence, whose block diagram is shown in FIG. 32.

Register initial value $r_{init}=[00101011r_6r_5r_4r_3r_2r_1r_0]_b$, MSB on left, LSB on right. Wherein, $[r_6r_5r_4r_3r_2r_1r_0]_b$=CAP_MAC is least 7 bits of MAC address of CAP.

Modulation Mapping

Sequence is BPSK modulated, sequence $C_i$ was obtained.

Sub-carrier Mapping

Sequence $C_i$ was performed sub-carrier mapping according to following formula, afford sequence $M_i$.

$$M_{i,k} = \begin{cases} C_{i,k+112} & \text{if } -112 \leq k < 0 \\ C_{i,k+111} & \text{if } 1 \leq k < 113 \\ 0 & \text{otherwise} \end{cases}$$

Frequency-domain Cyclic Shift

Sub-carriers mapped $M_i$ sequence perform cyclic shift according to following formula, obtaining sequence $T_i^j$.

$$T_{i,k}^j = M_{i,k} e^{-j\frac{2\pi k \delta_{CS}^j}{N_{IFFT}}}$$

wherein: $N_{IFFT}$ is points of IFFT, $$k \in \left[-\frac{N_{IFFT}}{2}, \frac{N_{IFFT}}{2} - 1\right],$$

$\delta_{CS}^j$ is a cyclic shift number parameter, in units of sampling points. For a 20 MHz system, $N_{IFFT}$=256, $\{\delta_{CS}\}$={0 32 64 96 128 160 192 224}.

wherein: $N_{IFFT}$ is points of IFFT, $$k \in \left[-\frac{N_{IFFT}}{2}, \frac{N_{IFFT}}{2} - 1\right],$$

$\delta_{CS}^j$ is a cyclic shift number parameter, in units of sampling points. For a 20 MHz system, $N_{IFFT}$=256 $\{\delta_{CS}\}$={0 32 64 96 128 160 192 224}.

Independent Resource Request Frame Resource Allocation

CAP allocate independent resource request frames for STA occupied UL-TCH resource by signaling as shown in table 12

7. Uplink Random Access Channel

The Random Access Signal Generation

The random access signal generation similar to uplink scheduling request signal. Sequence index of uplink random access signal and cyclic shift index number {i, j} random selected by each STA.

Figure 33:
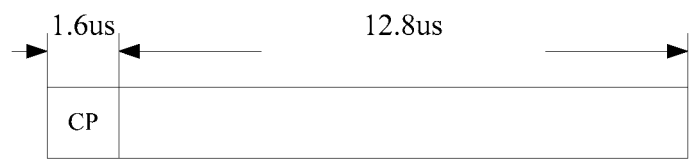
FIG. 33 shows first format of uplink random access channel.
Figure 34:
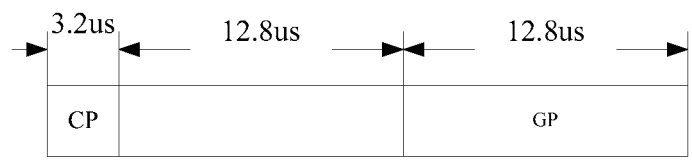
FIG. 34 shows second format of uplink random access channel.
Figure 35:
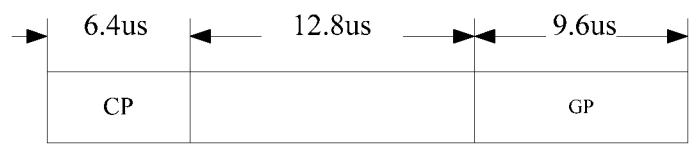
FIG. 35 shows third format of uplink random access channel.

Random Access Channel Format:

Format 1 as shown in FIG. 33,
$\{\delta_{CS}\}$={0 1.6 us 3.2 us 4.8 us 6.4 us 8.0 us 9.6 us 11.2 us}
Format 2 as shown in FIG. 34,
$\{\delta_{CS}\}$={0 3.2 us 6.4 us 9.6 us}
Format 1 as shown in FIG. 35,
$\{\delta_{CS}\}$={0 6.4 us}

Random Access Request Frame Resource Allocation:

CAP by signaling as STA allocation as shown in table 13 random access request frame takes UL-TCH resources.

TABLE 12 resource request frame resource allocation

| Bit | Definition |
|---|---|
| $b_3b_2b_1b_0$ | Broadcast Type<br>$b_3b_2b_1b_0$ = 0110, Independent resource request frame (allocating resource for independent resource request frame) |
| $b_7b_6b_5b_4$ | Reserved |
| $b_{23}b_{22} \ldots b_8$ Allocation1 | $b_9b_8$ = 00, Scheduling request corresponding to the first OFDM symbols of UL-SRCH<br>$b_9b_8$ = 01, Scheduling request corresponding to the second OFDM symbols of UL-SRCH<br>$b_9b_8$ = 10, Scheduling request corresponding to the third OFDM symbols of UL-SRCH<br>$b_9b_8$ = 11, Scheduling request corresponding to the 4th OFDM symbols of UL-SRCH<br>$b_{11}b_{10}$, PN Sequence index, the threshold value: 0~3<br>$b_{14}b_{13}b_{12}$, PN sequence frequency domain cyclic shift index<br>000 Cyclic shift 0, 001 cyclic shift 32, so on 111 cyclic shift 224<br>$b_{17}b_{16}b_{15}$, The lowest 3 bits indicates of system frame number when scheduling request occurs<br>$b_{23}b_{22} \ldots b_{18}$, Resources are allocated for scheduling request signaling/ feedback channel start position index, of threshold ranges 1~63, field value of 0 indicates invalid indication |
| $b_{39}b_{38} \ldots b_{24}$ Allocation 2 | $b_{25}b_{24}$, Definition is same as $b_9b_8$<br>$b_{27}b_{26}$, PN Sequence index, the threshold value: 0~3<br>$b_{30}b_{29}b_{28}$, PN sequence frequency domain cyclic shift index<br>000 Cyclic shift 0, 001 cyclic shift 32, so on 111 cyclic shift 224<br>$b_{33}b_{32}b_{31}$, The lowest 3 bits indicates of system frame number when scheduling request occurs.<br>$b_{39}b_{38} \ldots b_{34}$, Resources are allocated for scheduling request signaling/ feedback channel start position index, of threshold ranges 1~63, field value of 0 indicates invalid indication |
| $b_{55}b_{54} \ldots b_{40}$ Allocation 3 | $b_{41}b_{40}$, Definition is same as $b_9b_8$<br>$b_{43}b_{42}$, PN Sequence index, the threshold value: 0~3<br>$b_{46}b_{45}b_{44}$, PN sequence frequency domain cyclic shift index<br>000 cyclic shift 0, 001 cyclic shift 32, so on 111 cyclic shift 224<br>$b_{49}b_{48}b_{47}$, The lowest 3 bits indicates of system frame number when scheduling request occurs.<br>$b_{55}b_{54} \ldots b_{50}$, Resources are allocated for scheduling request signaling/ feedback channel start position index, of threshold ranges 1~63, field value of 0 indicates invalid indication |
| $b_{71} b_{70} \ldots b_{56}$ | 16 Bit CRC is scrambled by BSTAID |

TABLE 13 random access request frame resource allocation

| Bit | Definition |
|---|---|
| $b_3b_2b_1b_0$ | Broadcast type<br>$b_3b_2b_1b_0$ = 0100, Random access request frame (allocating resource for random access request frame) |
| $b_7b_6b_5b_4$ | Reserved |
| $b_{31}b_{30} \ldots b_8$<br>Allocation 1 | $b_9b_8$, PN Sequence index, the threshold value: 0~3<br>PN sequence frequency domain cyclic shift index<br>000 cyclic shift 0, 001 cyclic shift 32, so on 111 cyclic shift 224<br>$b_{15}b_{14}b_{13}$, The lowest 3 bits indicates of system frame number when random access occurs<br>$b_{25}b_{24} \ldots b_{16}$, Emission timing advance<br>$b_{31}b_{30} \ldots b_{26}$, Start position index of Resources are allocated for random access request signaling/feedback channel, of threshold ranges 1~63, field value of 0 indicates invalid indication |
| $b_{55}b_{54} \ldots b_{32}$<br>Allocation 2 | $b_{33}b_{32}$ PN Sequence index, the threshold value: 0~3<br>$b_{36}b_{35}b_{34}$, PN sequence frequency domain cyclic shift index<br>000 cyclic shift 0, 001 cyclic shift 32, so on 111 cyclic shift 224<br>$b_{39}b_{38}b_{37}$, The lowest 3 bits indicates of system frame number when random access occurs<br>$b_{49}b_{48} \ldots b_{40}$, Emission timing advance<br>$b_{55}b_{54} \ldots b_{50}$, Start position index of Resources are allocated for random access request signaling/feedback channel, of threshold ranges 1~63, field value of 0 indicates invalid indication |
| $b_{71} b_{70} \ldots b_{56}$ | 16 Bit CRC is scrambled by BSTAID |

Wherein, Emission timing advance is $D(b_{i+5} b_{i+4} \ldots b_i) \cdot N$, Unit: sampling points. timing advance in units of 100 ns, If the sampling clock is 20 MHz, N=2.

Random Access Response Frame Resource Allocation:

CAP by signaling as shown in table 14 to STA indicate a random access response frames take DL-TCH resources.

TABLE 14 random access response frame resource allocation

| Bit | Definition |
|---|---|
| $b_3b_2b_1b_0$ | Broadcast Type<br>$b_3b_2b_1b_0$ = 0101, Random access request frame (allocating resource for random access request frame) |
| $b_7b_6b_5b_4$ | Reserved |
| $b_{23}b_{22} \ldots b_8$<br>Allocation1 | $b_9b_8$, PN Sequence index, the threshold value: 0~3<br>$b_{12}b_{11}b_{10}$, PN sequence frequency domain cyclic shift index<br>000 cyclic shift 0, 001 cyclic shift 32, so on 111 cyclic shift 224<br>$b_{15}b_{14}b_{13}$, The lowest 3 bits indicates of system frame number when random access occurs<br>$b_{21}b_{20} \ldots b_{16}$, Start position index of Resources are allocated for random access request signaling/feedback channel, of threshold ranges 1~63, field value of 0 indicates invalid indication<br>$b_{23}b_{22}$, Reserved |
| $b_{39}b_{38} \ldots b_{24}$<br>Allocation2 | $b_{25}b_{24}$, PN Sequence index, the threshold value: 0~3<br>$b_{28}b_{27}b_{26}$, PN sequence frequency domain cyclic shift index<br>000 cyclic shift 0, 001 cyclic shift 32, so on 111 cyclic shift 224<br>$b_{31}b_{30}b_{29}$, The lowest 3 bits indicates of system frame number when random access occurs<br>$b_{37}b_{36} \ldots b_{32}$, Start position index of Resources are allocated for random access request signaling/feedback channel, of threshold ranges 1~63, field value of 0 indicates invalid indication<br>$b_{39}b_{38}$, Reserved |
| $b_{55}b_{54} \ldots b_{40}$<br>Allocation3 | $b_{41}b_{40}$, PN Sequence index, the threshold value: 0~3<br>$b_{44}b_{43}b_{42}$, PN sequence frequency domain cyclic shift index<br>000 cyclic shift 0, 001 cyclic shift 32, so on 111 cyclic shift 224<br>$b_{47}b_{46}b_{45}$, The lowest 3 bits indicates of system frame number when random access occurs<br>$b_{53}b_{52} \ldots b_{48}$, Start position index of Resources are allocated for random access request signaling/feedback channel, of threshold ranges 1~63, field value of 0 indicates invalid indication<br>$b_{55}b_{54}$, Reserved |
| $b_{71} b_{70} \ldots b_{56}$ | 16 Bit CRC is scrambled by BSTAID |

Uplink Power Control

Open Loop Power Control

Considering the channel reciprocity of TDD system up-link and down-link, open-loop power control may be employed.

$$P_{STA} = \min\{P_{STA\_MAX}, PL_{OL} + C/N + 10 \log_{10}(BW)\}$$
(dBm)

wherein:

$PL_{OL}$: Transmission path loss estimate. According to STA received signal power with the CAP transmit power estimate. CAP transmit power BCF frame indicates that the MAC layer.

C/N: Different MCS corresponding carrier-to-noise ratio

BW: Transmission bandwidth for STA allocated by CAP

Closed-loop Control:

TABLE 15 closed loop control signaling

| Bit | Definition |
|---|---|
| $b_3b_2b_1b_0$ | Broadcast Type<br>$b_3b_2b_1b_0$ = 1000, Closed loop link control |
| $B_7b_6b_5b_4$ | Reserved |
| $b_{55}b_{54} \ldots b_8$ Indication | $b_{19}b_{18} \ldots b_8$, STAID<br>$b_{29}b_{28} \ldots b_{20}$, Timing advance<br>$b_{31}b_{30}$, Reserved<br>$b_{39}b_{38} \ldots b_{32}$, transmit power adjustment is $b_{39}b_{38} \ldots b_{32}$, represents the signed decimal number n, unit dBm. Wherein, n = −128~127 (Negative portion expressed in complement form)<br>$b_{55}b_{54} \ldots b_{40}$, Reserved |
| $b_{71} b_{70} \ldots b_{56}$ | 16 Bit CRC is scrambled by BSTAID |

Embodiment 15

Embodiments of the present invention provide a resource indication method, used to indicate that the signaling and/or feedback transmission resources, comprising:

Step 1: generates scheduling signaling, the scheduling indication carried in the signaling user within the resource group for the transmission of signaling and/or feedback resource indication information; The user resource group for user traffic data transmission;

Step 2: transmitting the scheduling signaling. Wherein, in the dispatch signaling also carries indicating user resource group information indicative of the start position and length of.

In the embodiment of the invention shown, resources for signaling and/or feedback transmission with user multiplexing, transmission resources according to the resource scheduling, configure the signaling feedback channel with accordingly transport channel multiplexing. Scheduling signaling format can be found in table 2, With $b_{54} b_{53} \ldots b_{49}$ indicates traffic transmission of from STA resource group index $D(b_{54} b_{53} \ldots b_{49})$ in OFDM symbol begins transmitting packet data, and demodulating the pilot. $D(b_{54} b_{53} \ldots b_{49})$ is decimal number corresponding to $b_{54} b_{53} \ldots b_{49}$, wherein $b_{54}$ is high, $b_{49}$ is low. Accordingly, as shown in FIG. 29, in user resource group, OFDM symbols 0 to OFDM symbol $D(b_{54} b_{53} \ldots b_{49})$−1 for signaling or feedback transmission, begins transmitting packet data and demodulating pilot from OFDM symbol with index $D(b_{54} b_{53} \ldots b_{49})$ in the STA resource group.

In signaling and/or feedback information is transmitted, according to double-ended agreed signaling and/or feedback transmission format transmission.

In order to achieve the above-mentioned resource indication method, embodiments of the present invention also provide a resource indicator device, comprising:

Encapsulation module, for generating scheduling signaling, said scheduling signaling carried indication information for indicating resource for the transmission of signaling and/or feedback in user resource group; Said user resource group are used for user traffic data transmission;

Sending module, used for sending the scheduling signaling.

Wherein, in said scheduling signaling also carries indication information used for indicating start position and length of user resource group.

Wherein, said scheduling signaling, further instructing transmission according to preset signaling and/or feedback transmission format.

Accordingly, a method for data transmission is also provided in embodiments of the present invention, for receiving the above scheduling signaling, data for transmission, comprising:

Step 1: receives scheduling signaling, said scheduling signaling carried indication information for indicating resource for the transmission of signaling and/or feedback in user resource group; Said user resource group are used for user traffic data transmission;

Step 2: according to said indication information, transmitting signaling and/or feedback message in the corresponding position of user resource group.

Wherein, when transmitting data, further instructing transmission according to preset signaling and/or feedback transmission format.

In order to achieve the above-mentioned data transmission method, embodiments of the present invention also provide a data transmitting device, comprising:

Receiving module, used for receiving scheduling signaling, said scheduling signaling carried indication information for indicating resource for the transmission of signaling and/or feedback in user resource group; Said user resource group are used for user traffic data transmission;

Sending module, according to indication information, transmitting signaling and/or feedback message in the corresponding position of user resource group.

Wherein, said sending module, further used for instructing transmission according to preset signaling and/or feedback transmission format.

Embodiment 16

Embodiments of the present invention provide a resource indication method, used to indicate that the signaling and/or feedback transmission resources, comprising:

Step 1: generating a first scheduling signaling, said first scheduling signaling carried information for indicating signaling and/or feedback transmission resource;

Step 2: transmitting said first scheduling signaling.

Wherein, including start position and length in said information for indicating signaling and/or feedback transmission resource.

Wherein, including format in said information for indicating signaling and/or feedback transmission resource, said format used for indicating resource multiplexing mode.

Wherein, said resource multiplexing mode may be in the way of time division multiplexing, frequency division multiplexing, time-frequency multiplexing or code division multiplexing.

Wherein, including indicating applicative sub-channels or subcarriers for said first scheduling signaling under spectrum for aggregation mode.

Step 2 above further comprising subsequent steps 3 and 4:

Step 3: generating second scheduling signaling, information of resource for allocating signaling and/or feedback transmission carried in said second scheduling signaling, indicating resource of signaling and/or feedback transmission allocated for each user;

Step 4: transmitting said second scheduling signaling.

Wherein, said information of resource for allocating signaling and/or feedback transmission include one or more user identification STAID, and start position and length in the signaling and/or feedback transmission resource for corresponding STA.

Wherein, the STAID can be used for uniquely identify one STA.

Wherein, the STAID may also be a broadcast ID identification. Said broadcast ID identification refer to ID identification shared by all STA, each STA can receive corresponding signaling by said broadcast ID identification.

Wherein, may indicate length of said STA by instructing number of signaling and/or feedback channel occupied by said STA. A unit length of Each signaling and/or feedback channel is 1 OFDM symbols (mode 1, That is time division multiplexing manner) or 1 resource block (mode 2, Time-frequency multiplexed manner).

In the embodiment of the invention shown, resources for signaling and/or feedback transmission and user transmission resource are separated independently. In particular, in embodiment of present invention, first scheduling signaling as shown in table 6, second scheduling signaling as shown in table 7. Support two transmission modes as shown in FIGS. 29 and 30.

Embodiments of the present invention provide a resource indication method, used to indicate that the signaling and/or feedback transmission resources, comprising:

First encapsulation module, used for generating a first scheduling signaling, said first scheduling signaling carried information for indicating signaling and/or feedback transmission resource;

First Sending module, used for transmitting said first scheduling signaling.

Wherein, including start position and length in said information for indicating signaling and/or feedback transmission resource.

Wherein, including format in said information for indicating signaling and/or feedback transmission resource, said format used for indicating resource multiplexing mode.

Wherein, said resource multiplexing mode may be in the way of time division multiplexing, frequency division multiplexing, time-frequency multiplexing or code division multiplexing.

Wherein, including indicating applicative sub-channels or subcarriers for said first scheduling signaling under spectrum for aggregation mode.

Step 3: generating second scheduling signaling, information of resource for allocating signaling and/or feedback transmission carried in said second scheduling signaling, indicating resource of signaling and/or feedback transmission allocated for each user;

Step 4: transmitting said second scheduling signaling.

Wherein, said information of resource for allocating signaling and/or feedback transmission include one or more user identification STAID, and start position and length in the signaling and/or feedback transmission resource for corresponding STA.

Wherein, the STAID can be used for uniquely identify one STA.

Wherein, the STAID may also be a broadcast ID identification.

Wherein, may indicate length of said STA by instructing number of signaling and/or feedback channel occupied by said STA. A unit length of Each signaling and/or feedback channel is 1 OFDM symbols (mode 1, see FIG. 29) or 1 resource block (mode 2, see FIG. 30).

The present invention embodiment, each STA may share uplink transmission resources by time division, frequency division, code division, spatial division or multiplexed manner as described above in conjunction with.

What is claimed is:

1. A wireless communication system, comprising:
a central access point (CAP), determining current physical frame structure based on scheduled transmission resources, and transmitting information for indicating current physical frame structure in the current physical frame; wherein the determining current physical frame structure comprises: configuring leader sequence used for synchronization for current physical, and system information channel used for sending information of indicating current physical frame structure; wherein said CAP sends leader sequence, and information of indicating current physical frame structure in system information channel; or configuring leader sequence used for synchronization for current physical, and system information channel used for sending information of indicating current physical frame structure; and configuring selectively at least one of a plurality of channels for current physical frame; wherein said CAP sends said leader sequence, and information of indicating current physical frame structure in system information channel; and transmitting/receiving in the channel that is selectively configured; and
at least one station (STA) communicating with said CAP, according to information for indicating current physical frame structure in physical frame, determining structure of current physical frame;
wherein a length of each physical frame is unfixed, and the length of current physical frame is the sum of duration of each channel in the current physical frame.

2. The wireless communication system according to claim 1, wherein the length is determined by a structure of the each physical frame.

3. A network device, comprising:
a processor, according to scheduling transmission resource, determining current physical frame structure; and a communicator, in communication with the processor, transmitting indication current physical frame structure information in the current physical frame, and communicating with at least one terminal device,
wherein a length of each physical frame is unfixed, and the length of current physical frame is the sum of duration of each channel in the current physical frame,
wherein the determining current physical frame structure comprises: configuring leader sequence used for synchronization for current physical, and system information channel used for sending information of indicating current physical frame structure;

wherein said communicator sends leader sequence, and information of indicating current physical frame structure in system information channel; or configuring leader sequence used for synchronization for current physical, and system information channel used for sending information of indicating current physical frame structure; and configuring selectively at least one of a plurality of channels for current physical frame; wherein said communicator sends said leader sequence, and information of indicating current physical frame structure in system information channel; and transmitting/receiving in the channel that is selectively configured.

4. The network device of claim 3, wherein the determining current physical frame structure comprises:

configuring control channel for current physical frame, said control channel used for transmitting information of indicating allocation and scheduling of transmission resource, and transmission format of channel of occupying transmission resource.

5. The network device of claim 4, wherein the communicator sends a leader sequence, transmitting information of indicating current physical frame structure in system information channel; transmitting information of indicating allocation and scheduling of transmission resource, and transmission format of channel of occupying transmission resource in control channel; and transmitting/receiving in a selective channel; said communicator sends said leader sequence; transmitting a part of information of indicating current physical frame structure in system information channel, wherein including at least duration of the control channel, transmitting another part of information of indicating current physical frame structure in control channel, transmitting information of indicating allocation and scheduling of transmission resource, and transmission format of channel of occupying transmission resource in control channel; and, transmitting/receiving in the selective channel.

6. The network device of claim 4, wherein the multiplexing resources by one way or combination of time division multiplexing, frequency division multiplex, code division multiple access in said control channel and said system information channel.

7. The network device of claim 3, wherein information of indicating current physical frame structure comprises: information for indicating presence of first channel; wherein, said first channel is a channel used for transmitting a signal for downlink probe;

said information of indicating current physical frame structure further comprises:

information for indicating duration of second channel, said duration is greater than or equal to zero; or said first channel is uplink random access channel used for triggering new user access.

8. The network device of claim 3, wherein the information of indicating current physical frame structure comprising: information for indicating presence and duration of first channel information; wherein, said first channel is uplink scheduling request channel, used for triggering uplink transmission resource scheduling; or said first channel, for transmitting a signal for uplink probe;

said information of indicating current physical frame structure further comprising: information for indicating duration of second channel, said duration is greater than or equal to zero.

9. The network device of claim 3, wherein the information of indicating current physical frame structure further comprises: information for indicating duration of second channel, said duration is greater than or equal to zero.

10. A terminal device, comprising:

a processor, parsing information indicating current physical frame structure in current physical frame, determining current physical frame structure; and a communicator, in connection with the processor, communicating with network device within current physical frame, wherein a length of each physical frame is unfixed, and the length of current physical frame is the sum of duration of each channel in the current physical frame;

wherein the current physical frame is composed of leader sequence, and, system information channel carrying information of indicating current physical frame structure; said communicator receiving leader sequence, and, receiving information of indicating current physical frame structure in system information channel; or wherein the current physical frame comprising a preamble sequence, system information channel of carrying information indicating current physical frame structure, and, at least one of selective channels; said communicator receives said leader sequence, and, receives information of indicating current physical frame structure in system information channel; and transmitting/receiving in the at least one of selective channels.

11. The terminal device of claim 10, wherein the current physical frame structure comprises: control channel, used for transmitting information of indicating allocation and scheduling of transmission resource, and transmission format of channel of occupying transmission resource.

12. The terminal device of claim 11, wherein the communicator receive a leader sequence, receive information of indicating current physical frame structure in system information channel; receive information of indicating allocation and scheduling of transmission resource, and transmission format of channel of occupying transmission resource in control channel; and transmitting/receiving in the at least one of selective channels; or said communicator receives said leader sequence; receive a part of information of indicating current physical frame structure in system information channel, wherein including at least duration of the control channel, receives another part of information of indicating current physical frame structure in control channel, receives information of indicating allocation and scheduling of transmission resource, and transmission format of channel of occupying transmission resource in control channel; and transmitting/receiving in the at least one selective channels.

13. The terminal device of claim 10, when performing transmitting in the at least one of selective channels, said selective channels comprising:

channels, for transmitting a signal for uplink probe;

uplink scheduling request channel, for transmitting uplink scheduling request;

uplink transmission channel, for transmitting uplink traffic, and/or uplink signaling, and/or downlink traffic feedback; and/or downlink channel quality information (CQI), and/or downlink channel state information (CSI) feedback; and uplink random access channel, used for triggering new user access; or said selectively configured channels comprising:
channels, for transmitting a signal for uplink probe;
uplink scheduling request channel, for transmitting uplink scheduling request;
uplink transmission channel, for transmitting uplink traffic, and/or uplink signaling, and/or downlink traffic feedback;
channel quality information (CQI) feedback channel, for transmitting CQI feedback for downlink;
channel state information (CSI) feedback channels, for transmitting downlink CSI feedback; and
uplink random access channel used for triggering new user access.

14. The terminal device of claim 13 wherein, when perform receiving in the at least one of the selective channels, said selective channels comprise:
first downlink transmission channel, for transmitting downlink traffic, and/or downlink signaling, and/or uplink traffic feedback;
a channel, for transmitting a single for downlink probe; and
second downlink transport channels, for transmitting downlink traffic, and/or downlink signaling, and/or uplink traffic feedback.

15. The terminal device of claim 10, wherein, when performing receiving in at least one of configured selectively channel, said selectively configured channel comprises:
first downlink transmission channel, for transmitting downlink traffic, and/or downlink signaling, and/or uplink traffic feedback;
downlink probing channel, for transmitting downlink probe; and
second downlink transport channels, for transmitting downlink traffic, and/or downlink signaling, and/or uplink traffic feedback.

16. The terminal device of claim 10, wherein the information of indicating current physical frame structure comprises: information for indicating presence of first channel; wherein,
said first channel is a channel used for transmitting a signal for downlink probe;
said information of indicating current physical frame structure further comprises: information for indicating duration of second channel, said duration is greater than or equal to zero; or
said first channel is uplink random access channel used for triggering new user access.

17. The terminal device of claim 16, wherein the first channel, used for transmitting information of indicating allocation and scheduling of transmission resource, and transmission format of channel of occupying transmission resource; or
said first channel is an downlink transmission channel;
said information of indicating current physical frame structure further comprising: information for indicating presence and duration of second channel information; or
said information of indicating current physical frame structure further comprises: information for indicating presence of second channel; or
said first channel is an uplink transmission channel;
said information of indicating current physical frame structure further comprising: information for indicating presence and duration of second channel information; or
said information of indicating current physical frame structure comprises: information for indicating presence of second channel.

18. The terminal device of claim 11, wherein the information of indicating current physical frame structure comprising: information for indicating presence and duration of first channel information; wherein,
said first channel is uplink scheduling request channel, used for triggering uplink transmission resource scheduling; or
said first channel, for transmitting a signal for uplink probe;
said information of indicating current physical frame structure further comprising: information for indicating duration of second channel, said duration is greater than or equal to zero.

19. The terminal device of claim 10, wherein the information of indicating current physical frame structure further comprises: information for indicating duration of second channel, said duration is greater than or equal to zero.

* * * * *